(12) United States Patent
Daines et al.

(10) Patent No.: US 7,961,728 B2
(45) Date of Patent: *Jun. 14, 2011

(54) VIRTUAL SWITCHING USING A PROVISIONAL IDENTIFIER TO CONCEAL A USER IDENTIFIER

(75) Inventors: Kevin Q Daines, Liberty Lake, WA (US); Keith Michael Bly, Newman Lake, WA (US); Kelly Donald Fromm, Newman Lake, WA (US); C Stuart Johnson, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/646,682

(22) Filed: Dec. 23, 2009

(65) Prior Publication Data

US 2010/0098098 A1    Apr. 22, 2010

Related U.S. Application Data

(63) Continuation of application No. 11/421,766, filed on Jun. 2, 2006, now Pat. No. 7,653,056.

(51) Int. Cl.
*H04L 12/28* (2006.01)
*H04L 12/56* (2006.01)

(52) U.S. Cl. .................. 370/389; 370/392; 370/400

(58) Field of Classification Search ................ None
See application file for complete search history.

(56) References Cited

U.S. PATENT DOCUMENTS

| | | | |
|---|---|---|---|
| 5,526,349 A * | 6/1996 | Diaz et al. ............... | 370/392 |
| 5,550,803 A | 8/1996 | Crayford et al. | |
| 5,648,960 A | 7/1997 | Sakazaki et al. | |
| 6,233,224 B1 | 5/2001 | Yamashita et al. | |
| 6,724,781 B1 | 4/2004 | Dupont | |
| 6,765,924 B1 | 7/2004 | Wu et al. | |
| 6,798,775 B1 | 9/2004 | Bordonaro et al. | |
| 7,020,149 B1 | 3/2006 | Hellwig et al. | |
| 7,068,654 B1 | 6/2006 | Joseph et al. | |
| 7,133,423 B1 | 11/2006 | Chow et al. | |
| 7,218,648 B1 | 5/2007 | Jackson | |
| 7,346,682 B2 | 3/2008 | Basani et al. | |
| 2003/0012149 A1 | 1/2003 | Maggenti | |
| 2003/0051024 A1 | 3/2003 | Garnett et al. | |
| 2003/0174647 A1 | 9/2003 | Gutierrez et al. | |
| 2003/0206548 A1* | 11/2003 | Bannai et al. .............. | 370/389 |

(Continued)

OTHER PUBLICATIONS

U.S. Appl. No. 11/421,766, filed Jun. 2, 2006, Daines et al.

(Continued)

*Primary Examiner* — Chirag G Shah
*Assistant Examiner* — Srinivasa R Reddivalam
(74) *Attorney, Agent, or Firm* — Clements Bernard PLLC; Christopher L. Bernard; Jeffrey M. Measures

(57) ABSTRACT

This document describes tools useful in relaying a data stream from a data device to a network tunnel, such as by enabling virtual switching using a provisional identifier to conceal a user identifier. These tools, for example, may use an inexpensive switch module to create virtual switch instances. To do so, the tools may assign data packets to a virtual switch instance by mapping the data packets to a particular provisional identifier and then modifying the data packets to include the provisional identifier. The switch module may then forward the data packets based on the provisional identifier rather than on the user identifier. The tools may remove the provisional identifier before forwarding the data packets to a destination.

11 Claims, 24 Drawing Sheets

U.S. PATENT DOCUMENTS

| | | | |
|---|---|---|---|
| 2004/0066781 | A1 | 4/2004 | Shankar et al. |
| 2004/0151198 | A1 | 8/2004 | Brown et al. |
| 2005/0041695 | A1 | 2/2005 | Bordogna et al. |
| 2005/0141417 | A1 | 6/2005 | Huang et al. |
| 2005/0195845 | A1 | 9/2005 | Mayhew et al. |
| 2005/0220143 | A1* | 10/2005 | DelRegno et al. ............ 370/471 |
| 2005/0271033 | A1 | 12/2005 | Nakash |
| 2005/0286541 | A1* | 12/2005 | Bottorff et al. ............... 370/401 |
| 2006/0007939 | A1* | 1/2006 | Elangovan ............... 370/395.53 |
| 2006/0039374 | A1 | 2/2006 | Belz et al. |
| 2006/0130126 | A1 | 6/2006 | Touve et al. |
| 2006/0153179 | A1* | 7/2006 | Ho et al. ........................ 370/386 |
| 2006/0185002 | A1 | 8/2006 | Bachmutsky et al. |

OTHER PUBLICATIONS

U.S. Appl. No. 11/612,914, filed Dec. 19, 2006, Fromm et al.
U.S. Appl. No. 11/421,763, filed Jun. 1, 2006, Daines et al.
U.S. Appl. No. 11/421,764, filed Jun. 1, 2006, Daines et al.
U.S. Appl. No. 11/612,905, filed Dec. 19, 2006, Fromm et al.
Heinanen et al., "A Single Rate Three Color Marker" Network Marketing Group; Univ of PA Sep. 1999 (6 pp.).
Heinanen et al., "A Two Rate Three Color Marker" Network Marketing Group; Univ of PA Sep. 1999 (5 pp.).
"Layer 2 Virtual Private Networks, (L2VPN)."World Wide Packets, Undated (10 pp.).
"Provider Backbone of Carrier Ethernet Services—White Paper", World Wide Packets, Rev. 1.0, Undated (9 pp.).
"MPLS/VPLS Evolution: A Riverstone Perspective," Riverstone Networks Whitepapers, 2006 (11 pp.).
"Adding Scale, QoS and Operational Simplicity to Ethernet Whitepaper etc.," Nortel , 2006 (8 pp.).
Witters, J., et al., "VPLS Technical Tutorial; Technical Introduction etc.," ALCATEL, Undated (8 pp.).

* cited by examiner

VIRTUAL SWITCHING USING A PROVISIONAL IDENTIFIER TO CONCEAL A USER IDENTIFIER

RELATED APPLICATION DATA

This application is a continuation application of U.S. patent application Ser. No. 11/421,766 which was filed on Jun. 2, 2006 now U.S. Pat. No. 7,653,056, the entirety of which is incorporated herein by reference.

BACKGROUND

Service providers supply data service to customers within a particular geographical area, typically within a city or community. When a customer needs connectivity between two locations, and the service provider does not have its own connectivity between the two locations, the service provider may hand off the data stream to a transport provider, which transports data packets in a tunnel between service provider networks. Accordingly, service providers receive a data stream from a customer and modify the data stream so that it is suitable for transport through the tunnel.

Currently, many service providers provide this type of connectivity using devices and software that are expensive and difficult to configure, manage, and maintain. Some service providers, for example, are using conventional routers to map a data stream into a transport tunnel. Conventional routers are often expensive because they use custom silicon, large buffer spaces for storing data packets, and a complex, high-speed software module that manipulates those data packets.

SUMMARY

This document describes tools useful in relaying a data stream from a data device to a network tunnel, such as by enabling virtual switching using a provisional identifier to conceal a user identifier. These tools, for example, may use an inexpensive switch module to create virtual switch instances. To do so, the tools may assign data packets to a virtual switch instance by mapping the data packets to a particular provisional identifier and then modifying the data packets to include the provisional identifier. The switch module may then forward the data packets based on the provisional identifier rather than on the user identifier. The tools may remove the provisional identifier before forwarding the data packets to a destination.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools useful in relaying a data stream from a data device to a network tunnel. An environment in which the tools may enable these and other actions is set forth below in a section entitled Exemplary Operating Environment. This is followed by another section describing exemplary ways in which the tools may act to relay a data stream from a data device to a network tunnel and is entitled Exemplary Embodiments for Relaying a Data Stream from a Data Device to a Network Tunnel. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Figure 1:
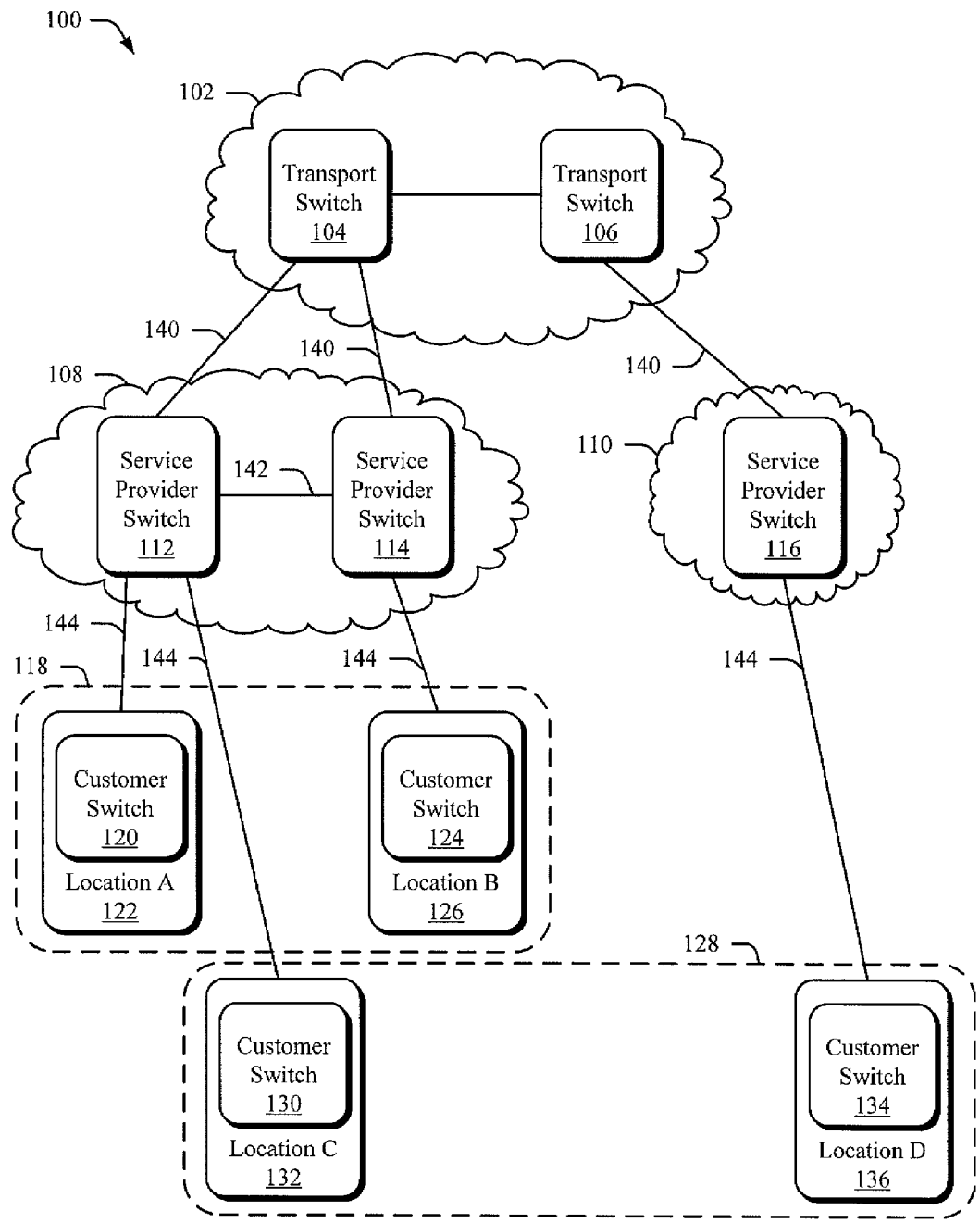
FIG. 1 illustrates an exemplary operating environment in which various embodiments of the tools may operate.

FIG. 1 illustrates an exemplary operating environment 100 for connecting a customer with a desired endpoint. The operating environment includes a transport network 102 comprising at least two transport switches 104, 106. The operating environment also includes two service provider networks 108, 110. In the depicted embodiment, the first service provider network 108 comprises two service provider switches 112, 114, and the second service provider network 110 comprises one service provider switch 116.

Of course, in other embodiments, the transport network 102 may include other transport switches and the service provider networks 108, 110 may include additional service provider switches. In addition, other embodiments may include additional transport provider networks or additional service provider networks.

The operating environment also includes four customer switches owned by two different customers. A first customer 118 has a first customer switch 120 in location A 122 and a second customer switch 124 in location B 126. A second customer 128 has a first customer switch 130 in location C 132 and a second customer switch 134 in location D 136.

In this embodiment, the operating environment includes transport switches and customer switches. However, transport routers or customer routers, or a combination of routers and switches may be used. The name of the transport device is not important as long as the function that the transport device performs includes accepting data packets having a tunnel tag on one port and egressing the data packets on another port based at least partially on the tunnel tag. Similarly, the name or type of the customer device is not important as long as the function that the customer device performs is accepting data packets from a customer network and providing the data packets to a service provider switch.

The term customer switch as used herein may refer to a device capable of switching data packets from an origination port to a destination port regardless of whether the origination port is associated with a customer or some other entity. For example, the other entity may be a user that does not have a customer relationship with the owner and operator of transport switches or service provider switches.

Similarly, a transport switch may refer to a network switch regardless of the distance that the switch carries traffic. Also, a service provider switch may refer to an intermediate switch in some situations. In these situations, the term intermediate network provider may be used rather than the term service provider.

The customer switches, transport switches, and service provider switches need not be owned and operated by distinct entities. In some embodiments, a single entity may own and operate the customer switches, transport switches, and service provider switches.

Transport links 140, at the top of FIG. 1 connect service provider switches to transport switches. Service provider link 142 connects the first service provider switch 112 to the second service provider switch 114. Customer links 144 connect the customer switches to the service provider switches.

The operating environment provides the second customer 128 with bi-directional connectivity between locations C and D. In one direction, the first service provider switch 112 receives a data stream from the customer switch in location C and puts the data stream into a transport tunnel associated with the transport network 102 by modifying the data packets of the data stream to have a tunnel tag associated with the transport tunnel. The tunnel may separate the data stream traveling through the tunnel from other data streams also present in the transport network.

The first service provider switch 112 sends the modified data stream to the first transport switch 104. The first transport switch 104 sends the modified data stream to the second transport switch 106, which sends the modified data stream to the third service provider switch 116.

The third service provider switch 116 modifies the data packets of the data stream by removing the tunnel tag and sends the data stream to the customer switch in location D. The tunnel tag value may comprise a Virtual Local Area Network Identifier (VLAN ID), MultiProtocol Label Switching (MPLS) label, or other identifier used to label a particular data packet.

In a complementary manner, the operating environment may relay a data stream originating from the customer switch in location D to the customer switch in location C. Consequently, the customer switch in location C and the customer switch in location D appear to each other to be on the same Local Area Network (LAN) even though they may be separated by a great distance because the service provider networks 108, 110 and the transport network 102 are transparent to the customer switches.

The data stream may comprise the data packets sent by the customer switch to the service provider switch on a particular link, or the data stream may comprise a portion of the data packets sent by the customer switch to the service provider switch on the particular link. One or more identifiers in a data packet such as a VLAN ID, MPLS label, a priority value, source address, destination address, or the like may define the portion of the data packets to be relayed to the remote customer location.

For example, a single physical port on a service provider switch may relay a plurality of data streams wherein a VLAN ID distinguishes each data stream such that all data packets having the same VLAN ID belong to the same data stream. In this example, each of the data streams is received on the same physical port but on a unique logical port. A logical port is a conceptual representation of a portion of a physical port. Each physical port may be divided into a plurality of logical ports and each logical port relays a single data stream.

The operating environment also provides the first customer 118 with bi-directional connectivity between locations A and B. In one direction, the first service provider switch 112 receives a data stream from the customer switch in location A and puts the data stream into an access tunnel associated with the service provider network 108 by modifying the data packets of the data stream to have access tags associated with the access tunnel.

An access tunnel is similar to a transport tunnel except that an access tunnel goes between service provider switches in a service provider network and does not utilize a transport network. When a customer needs connectivity between two locations, and the two locations are both served by a single service provider, but with two different service provider switches, the service provider may put the data stream into an access tunnel rather than using a transport network 102.

The first service provider switch sends the modified data stream to the second service provider switch 114. The second service provider switch modifies the data packets of the data stream by removing the access tag and sends the data stream to the customer switch 124 in location B. The access tag may comprise a VLAN ID, MPLS label, or other identifier used to label a particular data packet. In a complementary manner, the operating environment may relay a data stream originating in location B to location A.

Consequently, the customer switch in location A and the customer switch in location B appear to each other to be on the same LAN even though they may be located in different physical locations. The service provider network 108 is transparent to the customer switches.

Figure 2:
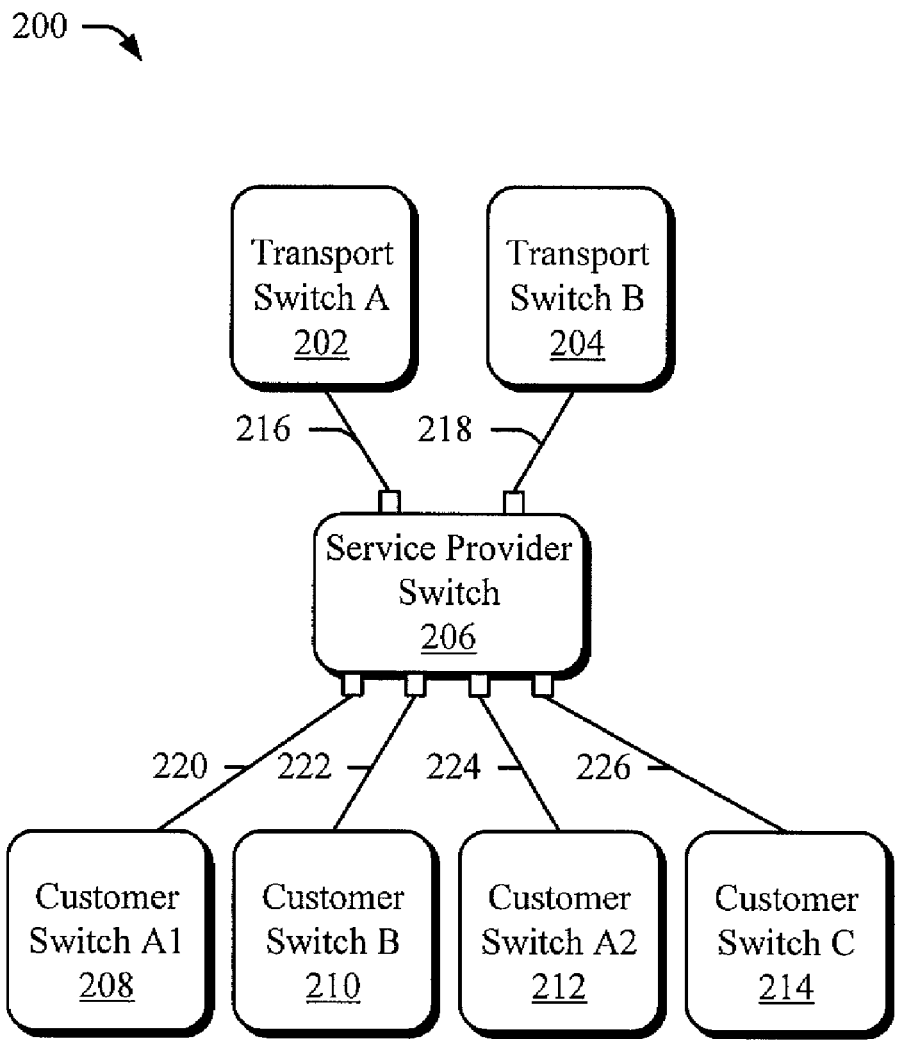
FIG. 2 illustrates a second exemplary operating environment in which various embodiments of the tools may operate.

FIG. 2 illustrates an exemplary operating environment 200 of switches comprising two transport switches 202, 204, a service provider switch 206, and four customer switches 208, 210, 212, 214. The service provider switch 206 provides a plurality of virtual switch instances that connect two or more transport switches or customer switches.

Each transport switch is connected to the service provider switch by a transport link 216, 218 and each customer switch is connected to the service provider switch by a customer link 220, 222, 224, 226. The transport links and customer links may use a medium such as twisted-pair copper, single-mode fiber, multi-mode fiber, wireless, or other medium known to those of skill in the art.

Figure 3:
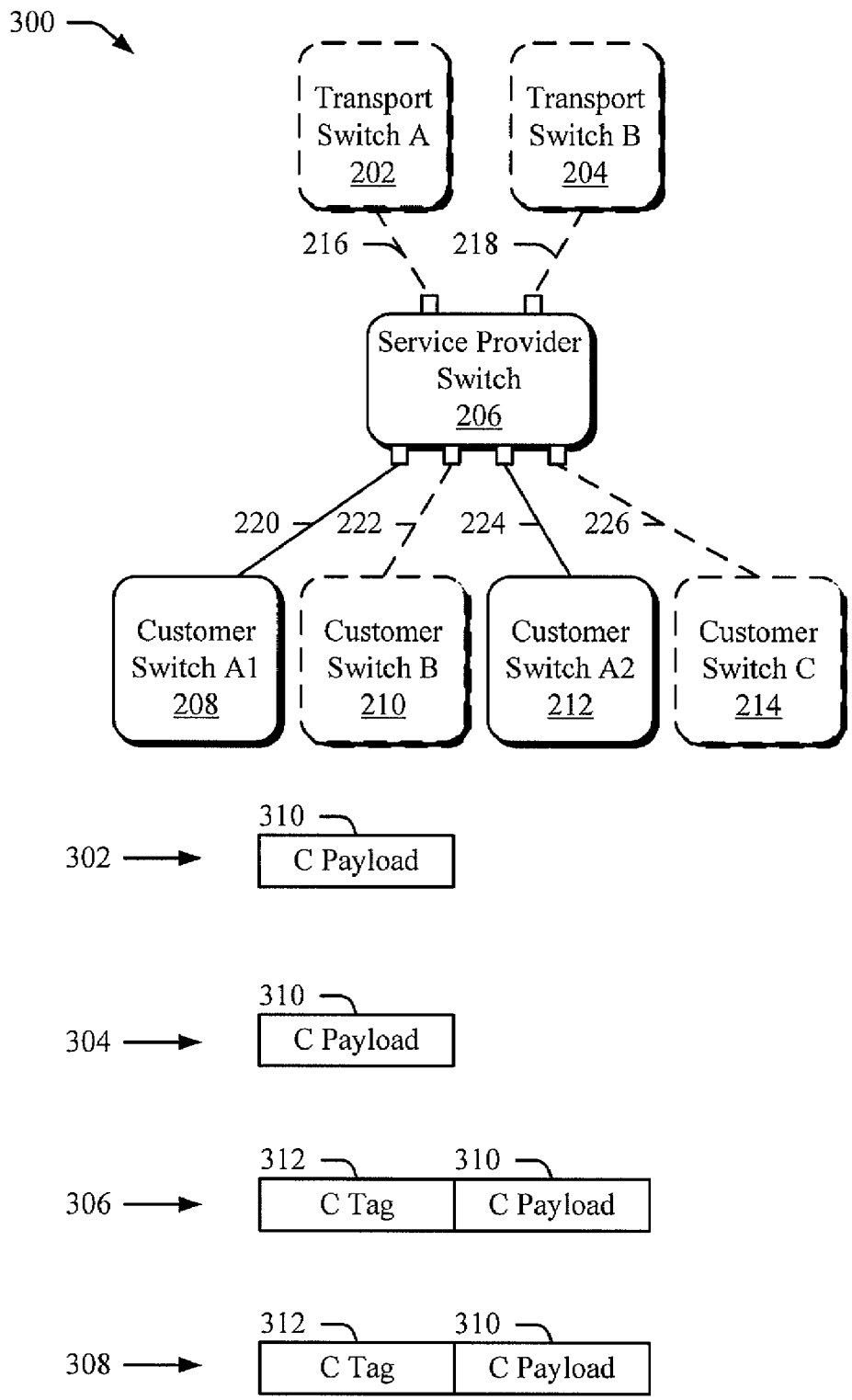
FIG. 3 illustrates the second exemplary operating environment of FIG. 2 along with exemplary data packet formats.

FIG. 3 illustrates an exemplary operating environment 300 providing a virtual LAN. The service provider switch provides the virtual LAN by allocating a portion of its resources to a particular virtual switch instance. The service provider switch keeps data packets associated with each virtual switch instance separate from data packets associated with other virtual switch instances so that there is no exchange of data packets between virtual switch instances.

In this embodiment, the service provider switch 206 is connected to two transport switches 202, 204 and four customer switches 208, 210, 212, 214 as was described above in relation to FIG. 2. The service provider switch is configured to provide a first virtual switch instance that includes customer switch A1 208 and customer switch A2 212.

In this embodiment, both customer switch A1 and customer switch A2 belong to same customer. The customer may send data packets from one customer switch to the other, but cannot directly connect the two customer switches because the switches are located in two different physical locations and the customer does not own physical facilities such as copper, fiber, or wireless links that go between the two physical locations. However, the service provider does own such physical facilities. The customer arranges for the service provider to supply connectivity between the two locations through the service provider switch.

The virtual switch instance relays data streams from customer switch A1 to customer switch A2 and vice versa but does not allow data streams from customer switch A1 or customer switch A2 to be relayed through the virtual switch instance to the transport switches or other customer switches connected to the service provider switch. Similarly, the virtual switch instance prevents data streams originating within one of the transport switches or within customer switch B or C from being relayed through the virtual switch instance to either customer switch A1 or A2.

Although they are not part of the virtual switch instance associated with customer switches A1 and A2, the transport switches, customer switch B, and customer switch C are still connected to the service provider switch. However, these devices belong to different virtual switch instances. These devices, as well as the links that connect them to the service provider switch are illustrated using dashed lines to indicate that they are physically connected to the service provider switch, but are not logically connected to this particular virtual switch instance.

FIG. 3 also illustrates four example data packets 302, 304, 306, 308. Each example data packet is a generalized depiction and is not meant to illustrate the individual bytes of the data packet or to depict accurate or scale lengths of the data packet or portions of the data packet. The depicted data packets represent actual data packets that may include more than just payload data. For example, the data packets may include overhead bits such as bits for error correction and detection, priority bits, type bits, addresses, and other bits.

Example data packets 302 and 304 illustrate the formats of a first type of data packet comprising customer payload 310 as it is relayed from customer switch A1 to customer switch A2. Example data packet 302 depicts the format of the first type of data packet on link 220. On this link, the example data packet comprises the customer payload 310. Example data packet 304 depicts the format of the first type of data packet on link 224. This example data packet also comprises the customer payload 310. Example data packets 302 and 304 illustrate the fact that the format of the data packet received by customer switch A2 is the same as the format of the data packet sent by customer switch A1.

Example data packets 306 and 308 illustrate the formats of a second type of data packet comprising a customer tag 312 and customer payload 310 as the second type of data packet is relayed from customer switch A1 to customer switch A2. The customer uses the customer tag 312 to identify different types of data packets. For example, the customer may use a first customer tag value for data packets bearing email and a second customer tag value for data packets bearing videoconference information. The customer tag value may be a VLAN ID, MPLS label, a priority value, or other bits of the data packet used as an identifier.

When connecting two customer sites, the customer tag is meaningful to the customer switches at each site, but may not be meaningful to the service provider switch or transport switch that provides connectivity between the two sites.

Example data packet 306 depicts the format of the second type of data packet on link 220. On this link, the example data packet comprises the customer tag and the customer payload. Example data packet 308 depicts the format of the second type of data packet on link 224. This example data packet also comprises the customer tag and the customer payload. Example data packets 306 and 308 illustrate that the format of the second type of data packet received by customer switch A2 is the same as the format of the second type of data packet sent by customer switch A1.

The value of the customer tag, in this example, is not important. In fact, the customer switches 208, 212 may use any desired customer tag value. The service provider switch relays data packets between the two switches regardless of the customer tag value. Since the service provider switch does not use the customer tag in making a forwarding decision and does not alter the customer tag, the service provider switch transparently relays data packets between the two customer switches.

Figure 4:
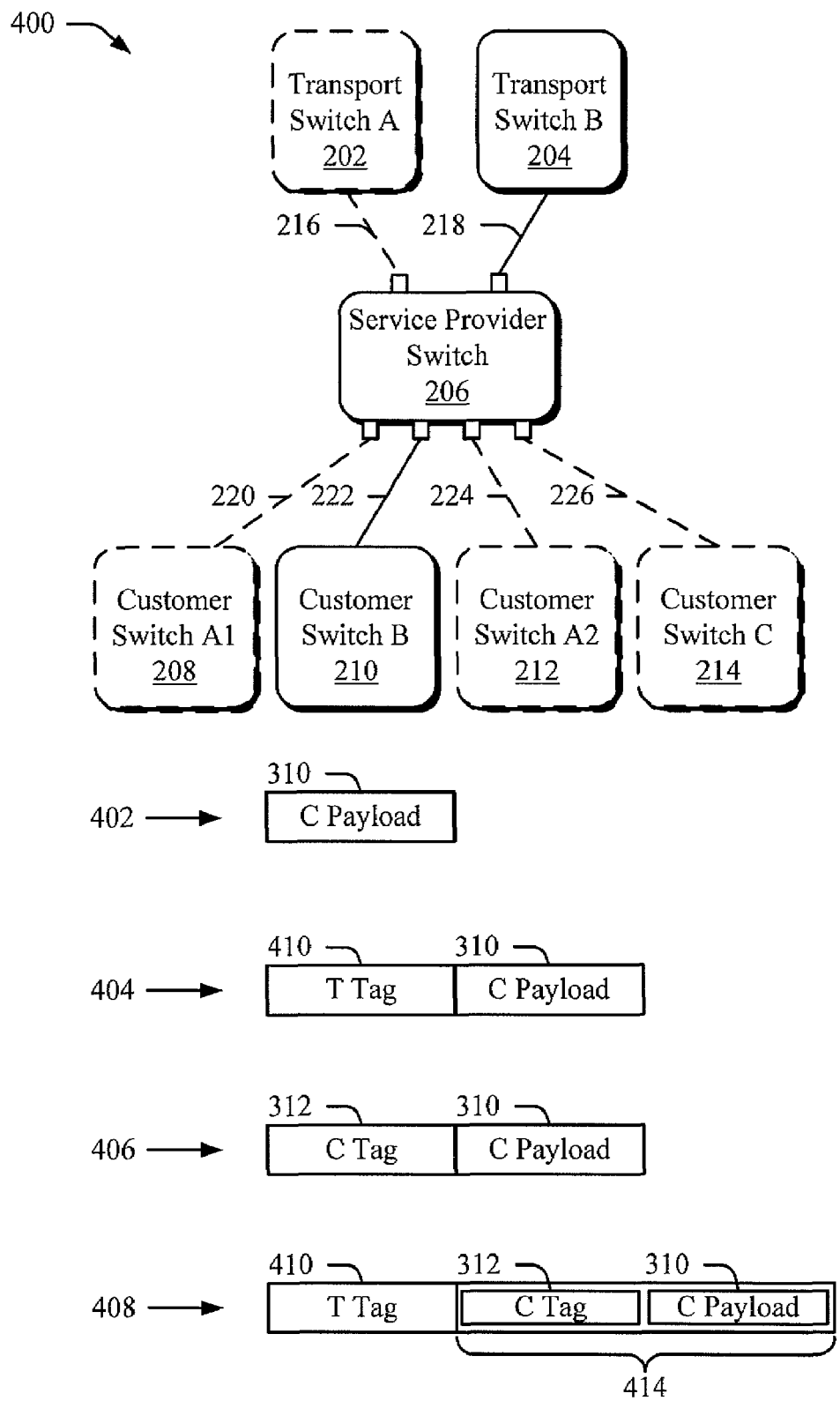
FIG. 4 illustrates the second exemplary operating environment in a second configuration.

FIG. 4 illustrates an exemplary operating environment 400 providing a virtual LAN. The service provider switch is configured to provide a second virtual switch instance that includes customer switch B 210 and transport switch B 204.

The virtual switch instance of the service provider switch relays data streams from customer switch B to transport switch B and vice versa but does not allow data streams from customer switch B or transport switch B to be relayed through the virtual switch instance to the other transport switch or customer switches connected to the service provider switch. Similarly, the virtual switch instance prevents data streams originating with transport switch A or with customer switches A1, A2, or C from being relayed through the virtual switch instance to either customer switch B or transport switch B.

FIG. 4 also illustrates four example data packets 402, 404, 406, 408. As described above, each example data packet is a generalized depiction. Example data packets 402 and 404 illustrate the format of a first type of data packet comprising customer payload 310 as the first type of data packet is relayed from customer switch B to transport switch B. Example data packet 402 depicts the format of the first type of data packet on link 222. This data packet is in a switch format having been transmitted by the customer switch. On this link, the example data packet comprises the customer payload 310.

Example data packet 404 depicts the format of the first type of data packet on link 218. This example data packet also comprises the customer payload 310. In addition, the packet includes a tunnel tag 410. In this embodiment, the service provider switch modifies a data stream received from customer switch B so that the data packets of the data stream are in a tunnel format compatible with a transport tunnel associated with transport switch B.

The transport switch uses the tunnel tag to forward data packets to other transport switches in a transport network. The transport switch also uses the tunnel tag to contain data packets within the transport tunnel. The tunnel tag may comprise one or more, or a combination of one or more, of a VLAN ID, MPLS label, a priority value, and other identifiers well known to those of skill in the art.

Example data packets 406 and 408 illustrate the format of a second type of data packet comprising a customer tag 312 and customer payload 310 as the second type of data packet is relayed from customer switch B to transport switch B. As discussed above in relation to FIG. 3, the customer uses the customer tag to identify different types of data packets.

Example data packet 406 depicts the format of the second type of data packet on link 222. On this link, the example data packet comprises the customer tag and the customer payload. Example data packet 408 depicts the format of the second type of data packet on link 218. This example data packet comprises the tunnel tag, the customer tag, and the customer payload. Since the transport switch does not utilize the customer tag, the transport switch treats the customer tag as if it was part of the payload. Thus, both the customer tag and the customer payload are part of a transport payload 414.

Figure 5:
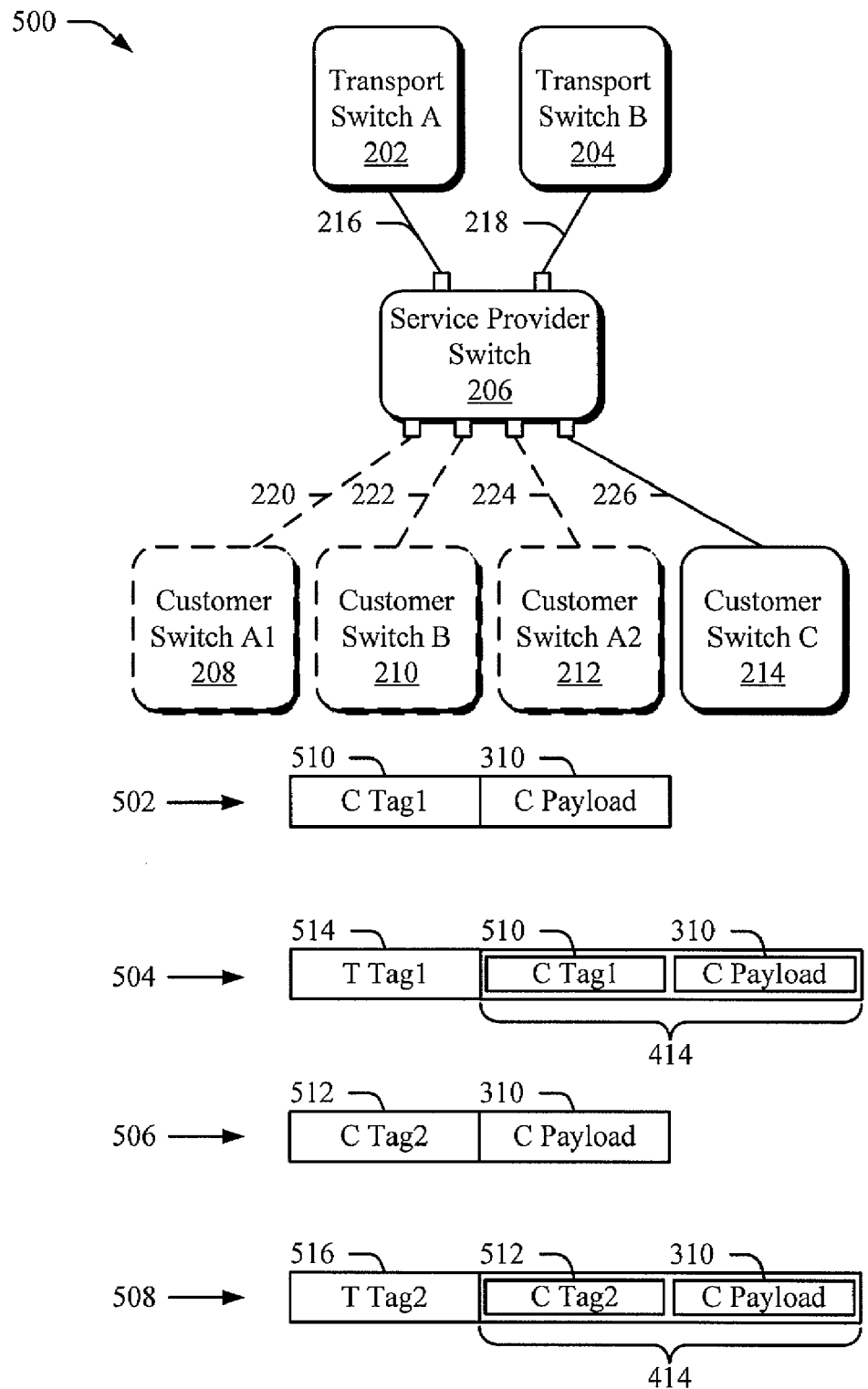
FIG. 5 illustrates the second exemplary operating environment in a third configuration.

FIG. 5 illustrates an exemplary operating environment 500 providing a virtual switch instance. In this embodiment, the data packets ingressing the service provider switch from customer switch C comprise two data streams. A first data stream is defined by the value of a first customer tag 510 and a second data stream is defined by the value of a second customer tag 512. The first data stream is in the same virtual switch instance as transport switch A. The service provider switch modifies the data packets of the first data stream by adding a first tunnel tag 514 and then sends the first data stream to transport switch A. The first customer tag and customer payload effectively become the transport payload 414 to transport switch A.

In addition, the service provider switch receives data packets from the tunnel associated with the first tunnel tag, modifies the data packets to remove the first tunnel tag, and then sends the data packets to customer switch C.

The virtual switch instance of the service provider switch relays the data stream associated with the first customer tag from customer switch C to transport switch A and vice versa but does not allow the data stream to be relayed through the virtual switch instance to the other customer switches or to transport switch B. Similarly, the virtual switch instance prevents data streams originating with transport switch B or with customer switches A1, A2, or B from being relayed through the virtual switch instance to either customer switch C or transport switch A.

A customer may choose to utilize the first data stream (defined by the first customer tag) to communicate with a customer switch in a first distant physical location and the second data stream (defined by the second customer tag) to communicate with a customer switch in second distant physical location. Rather than connecting the customer switch to the service provider switch using two links, one for each data stream, it may be more economical to use a single link for both data streams and segregate the data streams by using two customer tags.

The second data stream is in the same virtual switch instance as transport switch B. The service provider switch modifies the data packets of the second data stream by adding a second tunnel tag 516 and then sends the second data stream to transport switch B. The second customer tag and customer payload effectively become the transport payload 414 to transport switch B. In addition, the service provider switch receives data packets from the tunnel associated with the second tunnel tag, modifies the data packets to remove the second tunnel tag, and then sends the data packets to customer switch C.

The virtual switch instance of the service provider switch relays the data stream associated with the second customer tag from customer switch C to transport switch B and vice versa but does not allow the data stream to be relayed through the virtual switch instance to the other customer switches or to transport switch A. Similarly, the virtual switch instance prevents data streams originating with transport switch A or with customer switches A1, A2, or B from being relayed through the virtual switch instance to either customer switch C or transport switch B.

FIG. 5 also illustrates four example data packets 502, 504, 506, 508. As described above, each example data packet is a generalized depiction. Example data packets 502 and 504 illustrate the format of a first data packet comprising the first customer tag 510 and customer payload 310 as the first data packet is relayed from customer switch C to transport switch A. As discussed above in relation to FIG. 3, the customer uses the customer tag to identify different types of data packets.

Example data packet 502 depicts the format of the first type of data packet on link 226. On this link, the example data packet comprises the first customer tag and the customer payload. Example data packet 504 depicts the format of the first type of data packet on link 216. This example data packet comprises the first tunnel tag, the first customer tag, and the customer payload. Since the transport switch does not utilize the first customer tag, the transport switch treats the first customer tag as if it was part of the payload. Thus, both the first customer tag and the customer payload are part of the transport payload 414.

Example data packets 506 and 508 illustrate the format of a second type of data packet comprising the second customer tag 512 and customer payload 310 as the second data packet is relayed from customer switch C to transport switch B. As discussed above in relation to FIG. 3, the customer uses the customer tag to identify different types of data packets.

Example data packet 506 depicts the format of the second type of data packet on link 226. On this link, the example data packet comprises the second customer tag and the customer payload. Example data packet 508 depicts the format of the second type of data packet on link 218. This example data packet comprises the second tunnel tag, the second customer tag, and the customer payload. Since the transport switch does not utilize the second customer tag, the transport switch treats the second customer tag as if it was part of the payload. Thus, both the second customer tag and the customer payload are part of the transport payload 414.

Figure 6:
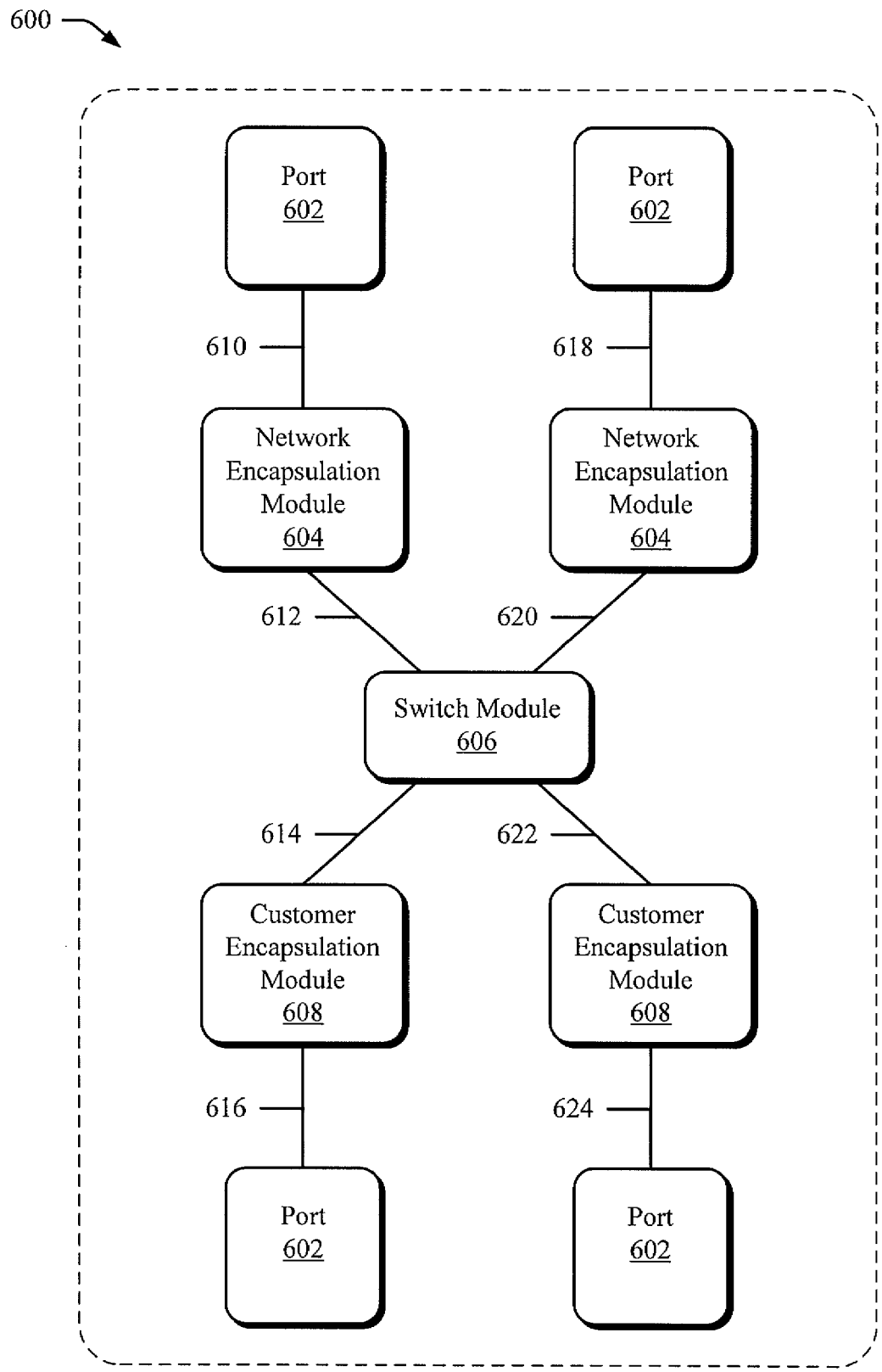
FIG. 6 illustrates an exemplary apparatus capable of relaying a data stream from a data device to a network tunnel.

Exemplary Embodiments for Relaying a Data Stream from a Data Device to a Network Tunnel FIG. 6 illustrates one embodiment of a service provider switch 600 capable of providing virtual switch instances. The service provider switch comprises at least two ports 602, at least one network encapsulation module 604, a switch module 606, at least one customer encapsulation module 608, and links 610, 612, 614, 616, 618, 620, 622, 624 connecting the modules and ports together.

The port connects the service provider switch to another device such as a customer switch or transport switch via a link. The port adapts data packets for transmission on the particular link medium such as twisted pair copper, single-mode fiber, multi-mode fiber, or wireless.

The network encapsulation module performs inline encapsulation and de-encapsulation of data packets. Encapsulation is the process of adding a tag to a data packet and de-encapsulation is the process of removing a tag from a data packet. The network encapsulation module may perform encapsulation and de-encapsulation without altering the customer payload portion of a data packet.

For data packets ingressing the network encapsulation module from a port and egressing the network encapsulation module to the switch module, the network encapsulation module removes a tunnel tag from the data packets and adds a provisional tag to the data packets. This provisional tag enables the switch module to distinguish one virtual switch instance from another and is described in greater detail below. For data packets ingressing the network encapsulation module from the switch module and egressing to a port, the network encapsulation module removes the provisional tag from the data packets and adds the tunnel tag to the data packets.

The network encapsulation module is a low-latency module since the amount of time that data packets are delayed while being modified is very short. Preferably, the network encapsulation module is implemented as logic in a Field Programmable Gate Array (FPGA), an Application Specific Integrated Circuit (ASIC) or other device that enables the network encapsulation module to have low latency.

The switch module 606 is a conventional, layer 2 switch module capable of switching data packets based on a provisional tag value such as a VLAN ID. When a provisional tag is present in a data packet, the switch module ignores a customer tag (if present) when making switching decisions. In this situation, the customer tag is effectively concealed from the switch module because the switch module is unable to make data packet forwarding decisions based on the concealed customer tag.

The switch module is not capable of either modifying data packets to have a tunnel tag or utilizing tunnel tags that already exist in data packets in making a forwarding decision. The switch module may be capable of performing some routing or layer 3 functions, though this is not necessary. The switch module is distinct from both the network encapsulation module and the customer encapsulation module. The switch module has a plurality of ports that ingress and egress data packets. The switch module receives data packets and decides to which port to egress the data packets on by making a forwarding decision.

In some embodiments, one or more ports of the switch module may be configured to accept data packets having a particular provisional tag value and may be further configured to drop data packets presented to the ports that do not have the particular provisional tag value.

The switch module may be a single switch chip. Alternatively, the switch module may be a plurality of chips that work together to forward data packets from an origination port to a destination port. The switch module may be implemented in custom hardware such as an Application Specific Integrated Circuit (ASIC). The switch module may also be implemented in programmable hardware such as a Field Programmable Gate Array (FPGA).

Alternatively, the switch module may be implemented as software or firmware for a network processor, or may be implemented using other technology well known to those of skill in the art that is capable of forwarding data packets from an origination port to a destination port based on a provisional tag.

The customer encapsulation module 608 performs inline encapsulation and de-encapsulation of data packets. For data packets ingressing the customer encapsulation module from a port and egressing the customer encapsulation module to the switch module, the customer encapsulation module adds a provisional tag to each data packet. For data packets ingressing the customer encapsulation module from the switch module and egressing to a port, the customer encapsulation module removes the provisional tag.

The customer encapsulation module is a low-latency module since the amount of time that data packets are delayed while being modified is very short. Preferably, the network encapsulation module is implemented as logic in a Field Programmable Gate Array (FPGA), an Application Specific Integrated Circuit (ASIC) or other device that enables the network encapsulation module to have low latency.

Each link 610, 612, 614, 616, 618, 620, 622, 624 may be a bus, one or more circuit board traces or wires, or other device capable of connecting silicon devices together. Each link may convey data packets in both directions.

The provisional tag is present in packets within the service provider switch, but is not present in packets that egress the service provider switch since either the network encapsulation module or the customer encapsulation module strips the provisional tags from data packets before the data packets are sent to a port.

The service provider switch uses the provisional tag internally to create a virtual switch instance. The switch module enforces the virtual switch instance since it is capable of switching data packets based on the provisional tag value and since it does not allow for modification of the provisional tag.

The provisional tag is customer independent since it is added by the service provider switch and is unknown to the customer. The switch module makes switching decisions based on the provisional tag and may ignore any customer tags that are also present in a data packet. These properties enable customers to use customer tags in data packets that are sent to the service provider switch without having to coordinate with the service provider or other customers to be sure that another customer is not using the same customer tag value.

FIG. 6 depicts a particular embodiment of a service provider switch. Other embodiments are also capable of providing virtual switch instances. For example, the service provider switch may comprise customer encapsulation modules between each port and the switch module but comprise no network encapsulation modules.

In another embodiment, the service provider switch may comprise network encapsulation modules between each port and the switch module, but comprise no customer encapsulation modules. In yet another example, the service provider switch may comprise a mix of customer encapsulation modules and network encapsulation modules as long as there is either a network encapsulation module or a customer encapsulation module between each port and the switch module.

The switch module enables the service provider switch to be relatively inexpensive, here for example because the switch module is a conventional, low cost, layer 2 switch, though other switches may be used that are low cost or otherwise. Of course, it may be possible to create custom silicon that combines the functionality of the network encapsulation module, the customer encapsulation module, and the switch module, but such a device would be more expensive than the service provider switch described above because it would use custom silicon that is not subject to economies of scale associated with the conventional, low-cost, layer 2 switch.

Figure 7:
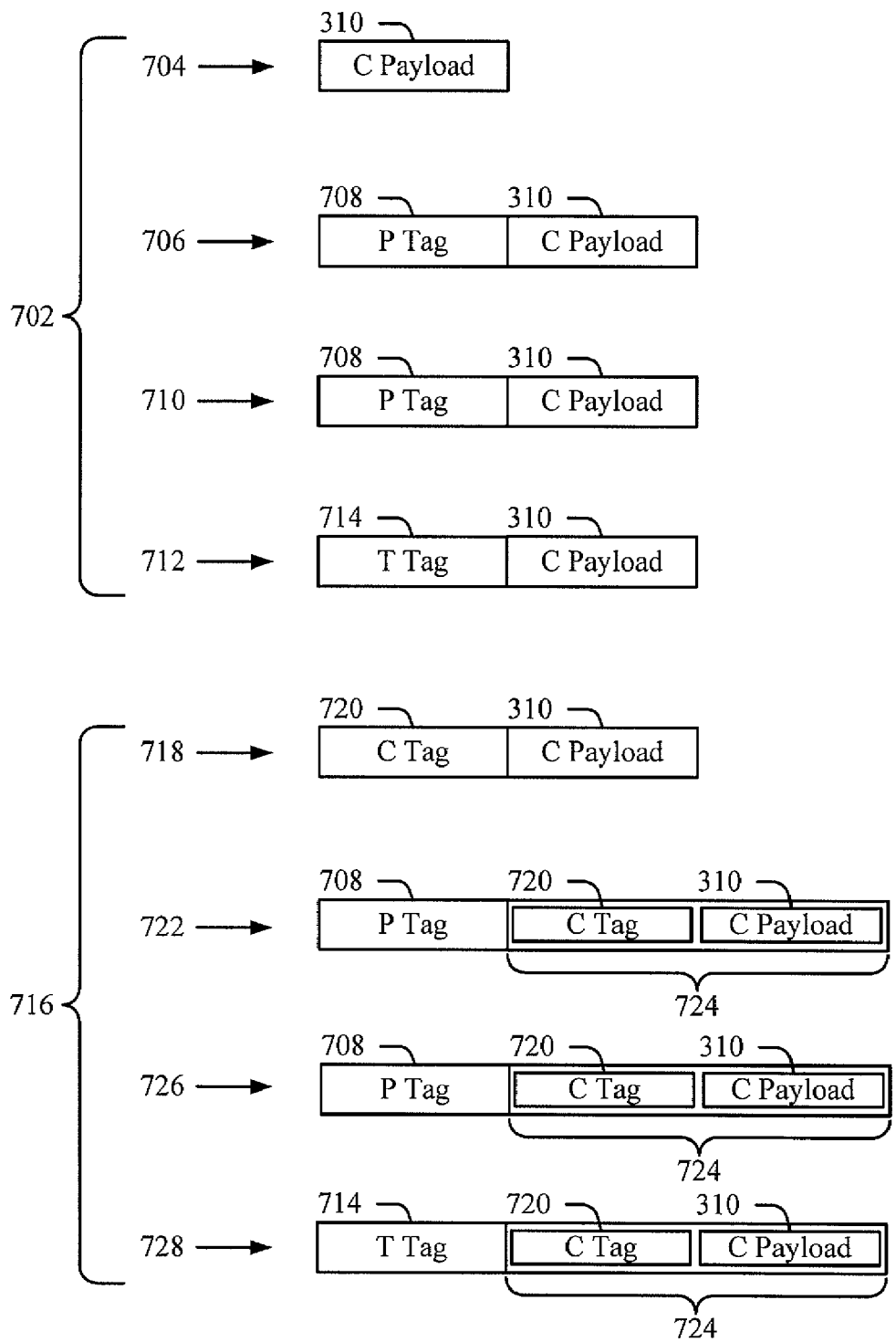
FIG. 7 illustrates exemplary data packet formats.

FIG. 7 illustrates eight example data packets present on various links of the service provider switch 600 of FIG. 6. As discussed above in relation to FIGS. 3-5, these example data packets are not exact packet representations. The lengths of each example data packet are not proportional to actual packet lengths.

The first set of example data packets 702 comprises data packets that do not have a customer tag. The first example data packet 704 illustrates a data packet on link 616 that has been received from a port 602. The data packet comprises customer payload 310.

The second example data packet 706 represents the first example data packet 704 after being processed by the customer encapsulation module 608. The second example data packet is present on link 614 and comprises a provisional tag 708 and the customer payload 310. The customer encapsulation module sends this packet to the switch module 606. The switch module decides which switch port to egress the data packet on based at least on the provisional tag and the virtual switch instance associated with the provisional tag.

The third example data packet 710 represents the second example data packet after it has been switched by the switching module. It is present on link 612. The third example data packet has the same format as the second example data packet.

The fourth example data packet 712 represents the third example data packet after the network encapsulation module 604 has removed the provisional tag and added a tunnel tag 714. The fourth example data packet is present on link 610.

The second set of example data packets 716 are data packets that have a customer tag. The fifth example data packet 718 illustrates a data packet on link 616 that has been received from a port. The data packet comprises a customer tag 720 and customer payload 310.

The sixth example data packet 722 represents the fifth example packet after it has been processed by the customer encapsulation module. It is present on link 614. The sixth example data packet comprises a provisional tag, a customer tag, and customer payload. The provisional tag is placed in a tag position a position within the data packet where the switch module will look for a tag. The customer tag has been moved out of the tag position.

Since the switch module does not utilize the customer tag, the switch module treats the customer tag as if it was part of the payload. Thus, both the customer tag and the customer payload are part of the provisional payload 724. In this example data packet, the provisional tag conceals the customer tag since the switch module treats the customer tag as part of the provisional payload.

The customer encapsulation module sends this packet to the switch module 606. The switch module decides which switch port to egress the data packet on based at least on the provisional tag and the virtual switch instance associated with the provisional tag.

The seventh example data packet 726 represents the sixth example data packet after it has been switched by the switching module. It is present on link 612. The seventh example data packet has the same format as the sixth example data packet.

The eighth example data packet 728 represents the seventh example data packet after the network encapsulation module 604 has removed the provisional tag and added a tunnel tag 714. The eighth example data packet is present on link 610.

Figure 8:
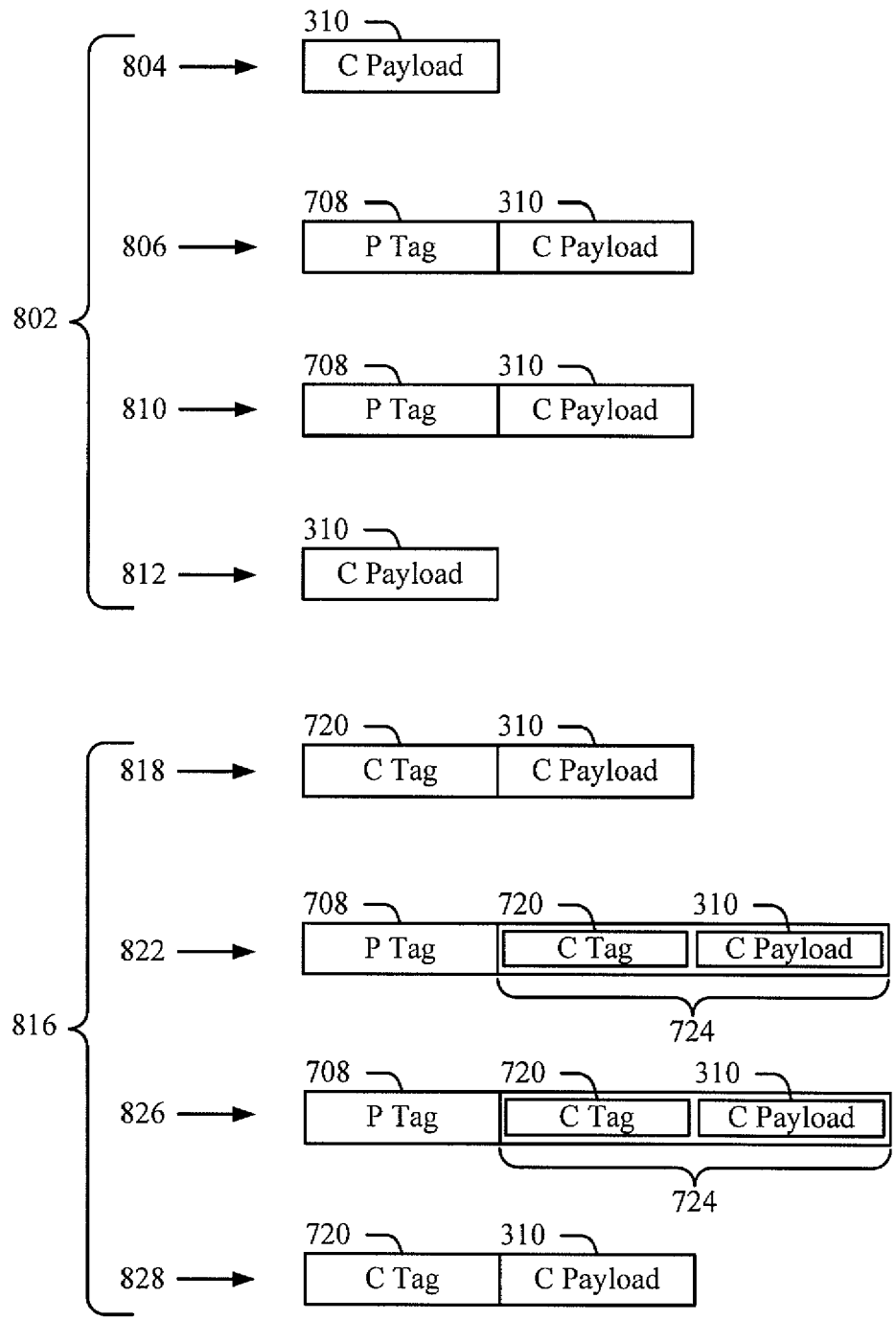
FIG. 8 illustrates more exemplary data packet formats.

FIG. 8 also illustrates eight example data packets present on various links of the service provider switch 600 of FIG. 6. As discussed above in relation to FIGS. 3-5, these example data packets are not exact packet representations. The lengths of each example data packet are not proportional to actual packet lengths.

The first set of example data packets 802 comprises data packets that do not have a customer tag. The first example data packet 804 illustrates a data packet on link 616 that has been received on a port 602. The data packet comprises customer payload 310.

The second example data packet 806 represents the first example data packet 804 after it has been processed by the customer encapsulation module 608. The second example data packet is present on link 614 and comprises a provisional tag 708 and the customer payload 310. The customer encapsulation module sends this packet to the switch module 606.

The switch module decides on which switch port to egress the data packet based at least on the provisional tag and the virtual switch instance associated with the provisional tag. In this example, a virtual switch instance has been configured between two customer switches.

The third example data packet 810 represents the second example data packet after it has been switched by the switching module and is present on link 622. The third example data packet has the same format as the second example data packet.

The fourth example data packet 812 represents the third example data packet after the customer encapsulation module 608 has removed the provisional tag. The fourth example data packet is present on link 624.

The second set of example data packets 816 comprises data packets that have a customer tag. The fifth example data packet 818 illustrates a data packet on link 616 that has been received on a port. The data packet comprises a customer tag 720 and customer payload 310.

The sixth example data packet 822 represents the fifth example packet after it has been processed by the customer encapsulation module. It is present on link 614. The sixth example data packet comprises a provisional tag, a customer tag, and customer payload. Since the switch module does not utilize the customer tag, the switch module treats the customer tag as if it was part of the payload. Thus, both the customer tag and the customer payload are part of the provisional payload 724.

The customer encapsulation module sends this packet to the switch module 606. The switch module decides which switch port to egress the data packet on based at least on the provisional tag and the virtual switch instance associated with the provisional tag. In this example, a virtual switch instance has been set up between two customer switches.

The seventh example data packet 826 represents the sixth example data packet after it has been switched by the switching module. It is present on link 622. The seventh example data packet has the same format as the sixth example data packet.

The eighth example data packet 828 represents the seventh example data packet after the customer encapsulation module has removed the provisional tag. The eighth example data packet is present on link 624.

Figure 9:
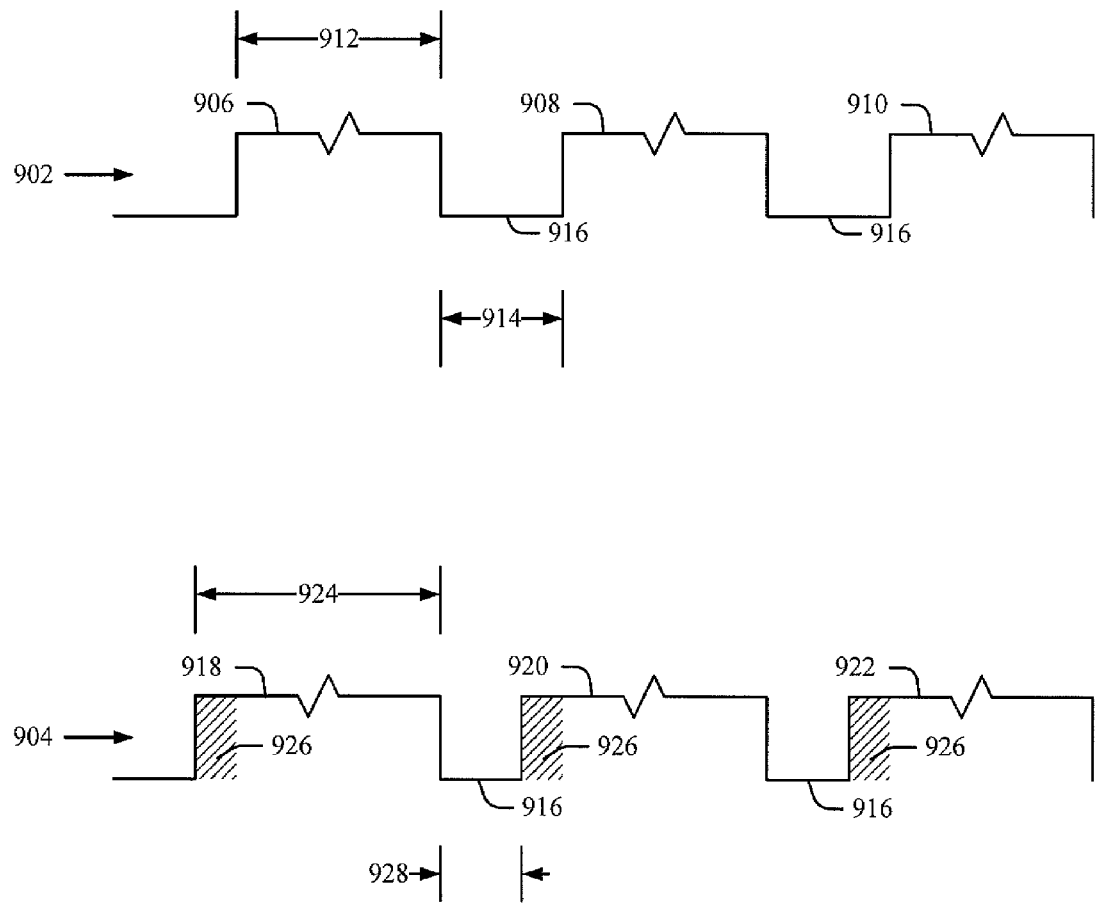
FIG. 9 illustrates an exemplary timing of data packet formats.

FIG. 9 illustrates two packet-timing diagrams 902, 904. The first packet-timing diagram 902 illustrates the transmission of three data packets 906, 908, 910 on the link 616 between the port and the customer encapsulation module of FIG. 6. The duration 912 of each data packet is not shown to scale compared with the duration 914 of the gaps 916 between data packets. The gaps between data packets are times during which the link 616 is idle.

The duration 912 of each data packet may vary. In fact, each of the three data packets may have a different duration. A standard for the particular technology that the data packets adhere to may specify a maximum packet duration and a minimum packet duration. The standard may additionally specify the minimum duration of a gap. The first packet-timing diagram illustrates three successive packets, each of which may have a different duration, separated by the minimum gap duration.

The second packet-timing diagram 904 illustrates the transmission of the three data packets of the first packet-timing diagram after they have been modified by the customer encapsulation module 608 to have a provisional tag. The second packet-timing diagram illustrates the data packets 918, 920, 922 on link 614 between the customer encapsulation module and the switch module of FIG. 6. Due to the addition of the provisional tag, the duration 924 of each of the packets has increased by the length of the provisional tag 926.

The customer encapsulation module receives data packets at line rate when it receives successive data packets separated by the minimum gap duration. When the customer encapsulation module receives data packets at line rate, it also transmits data packets to the switch module at line rate, despite having to make each received data packet longer due to the addition of the provisional tag. To transmit at line rate, the customer encapsulation module transmits data packets with a gap between them having a duration 928 that is less than the minimum gap duration defined by the standard governing link operation.

One characteristic of the conventional, layer 2 switch comprising the switch module is that it may accept data packets separated by a gap with a duration shorter than the minimum gap duration. The shortened gap may be used between packets processed by the switch module and the customer encapsulation module, since both are capable of processing data packets separated by the shortened gap. Data packets separated by the shortened gap are not transmitted outside of the service provider switch since devices connected to the service provider switch may not be able to process data packets separated by the shortened gap.

Figure 10:
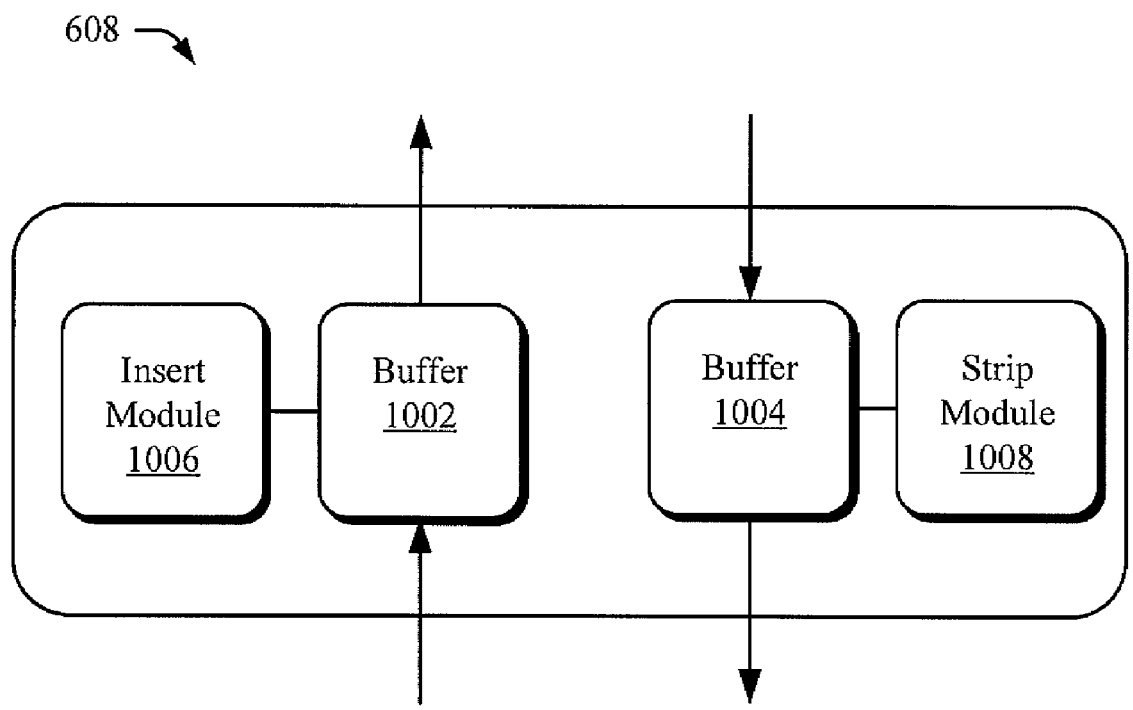
FIG. 10 illustrates an exemplary apparatus used in relaying a data stream from a data device to a network tunnel.

FIG. 10 illustrates one embodiment of a customer encapsulation module 608 configured to perform inline encapsulation and de-encapsulation of data packets. The customer encapsulation module comprises two buffers 1002, 1004, an insert module 1006, and a strip module 1008. Each buffer 1002, 1004 stores at least a portion of a data packet. In one embodiment, each buffer stores no more than a portion of a data packet in order to minimize latency introduced by the customer encapsulation module.

Each buffer may comprise a buffered, cut-through device. The buffer may logically comprise a First In First Out (FIFO) device, or other device well known to those of skill in the art.

The first buffer 1002 stores at least a portion of a data packet received from a port, such as the port 602 of FIG. 6. The insert module 1006 modifies a part of the portion of the data packet stored in the buffer. The first buffer 1002 then transmits the data packet to a switch module, such as the switch module 606 described above in relation to FIG. 6.

The second buffer 1004 stores at least a portion of a data packet received from the switch module. The strip module 1008 modifies a part of the portion of the data packet stored in the second buffer and then the second buffer transmits the data packet to a port, such as the port 602 described above in relation to FIG. 6.

The two buffers are logically distinct from each other and may have different storage capacities. However, the two buffers may be part of a single physical buffer. For example, the first and second buffers may be portions of a single Random Access Memory (RAM). The two buffers each introduce low latency since each stores a portion of a data packet, rather than a large number of data packets.

The insert module modifies data packets received by the customer encapsulation module from the port by inserting the provisional tag into the data packet, thereby lengthening the data packet as described above in relation to FIG. 9.

The strip module modifies data packets received by the customer encapsulation module from the switch module by removing the provisional tag from data packets, thereby shortening the data packet so that gaps between data packets transmitted to the port by the buffer have a duration equal to or greater than the minimum gap duration defined by the standard governing link operation.

Figure 11:
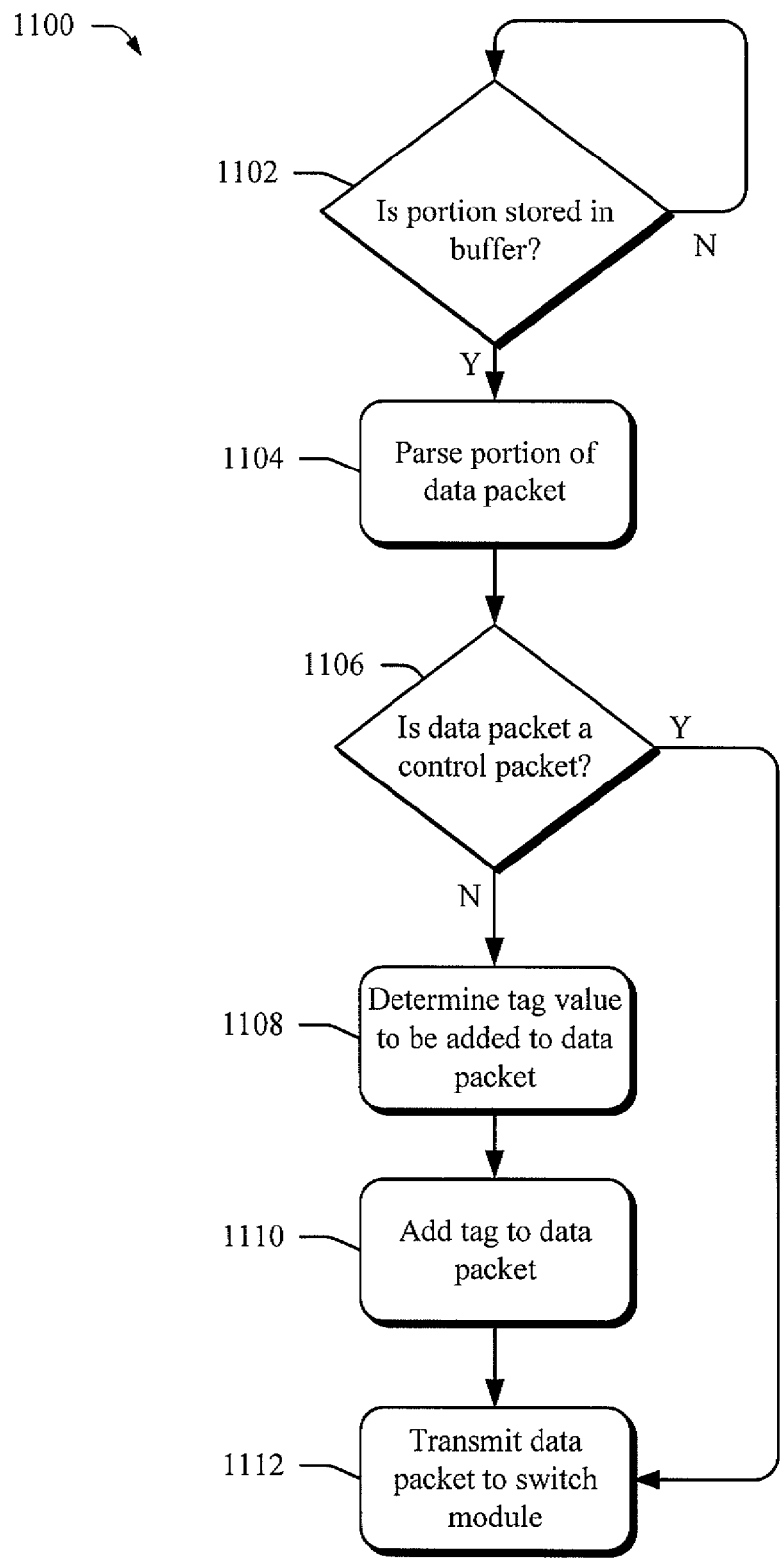
FIG. 11 is an exemplary process illustrating various embodiments and manners in which the tools relay a data stream from a data device to a network tunnel and that adds a tag.

FIG. 11 illustrates one embodiment of a method 1100 used by the insert module 1006 to add the provisional tag to a data packet. First, the insert module determines 1102 if a portion of a data packet is stored in the first buffer 1002. Once a portion of the data packet is stored, the insert module parses 1104 the portion. The portion may include a header that indicates whether the data packet is a control packet. The portion may also include a customer tag.

The entire data packet need not be stored in the buffer before the insert module parses the portion. In one embodiment, the buffer does not have capacity to store the entire data packet but does have capacity to store at least the portion.

In one embodiment, the first buffer notifies the insert module when the portion of the data packet is available in the first buffer. In another embodiment, the insert module monitors the first buffer to determine when the portion is available. Of course, the insert module may use other methods well known to those of skill in the art to determine when the portion is available.

The insert module parses the portion to determine 1106 whether the data packet is a control packet such as an Ethernet Bridge Protocol Data Unit (BPDU), a spanning tree BPDU, an Address Resolution Protocol (ARP) packet, a flow control packet, or other control packet well known to those of skill in the art. The insert module may, in some embodiments, parse the portion to determine a customer tag value used in the data packet.

If the data packet is a control packet, the insert module does not modify the control packet and the buffer transmits 1112 the unmodified control packet to the switch module. If the data packet is not a control packet, the insert module determines 1108 a value of a provisional tag to be added to the data packet.

In one embodiment, data packets received from the port (except for control packets) are modified so that they all have the same provisional tag value. In this embodiment, the data packets received from the port comprise a single data stream. The insert module may consult a mapping between the port and a provisional tag value to determine the provisional tag value that the insertion module will add to the data packets of the single data stream.

In another embodiment, the buffer receives multiple data streams from the port. In this embodiment, a unique customer tag value distinguishes each data stream. As discussed above in relation to FIG. 3, the customer tag may be a VLAN ID, MPLS label, a priority value, or other bits of the data packet used as an identifier. The insert module may consult a mapping between customer tag values and provisional tag values to determine which provisional tag value to assign to a particular data packet based on the particular customer tag value used in the packet.

Once the insert module has determined the provisional tag value, the insert module adds 1110 the provisional tag to the data packet. In one embodiment, the insert module writes the provisional tag value into the buffer in an appropriate location so that when the buffer transmits the data packet, the data packet contains the provisional tag in the correct location within the data packet.

Figure 12:
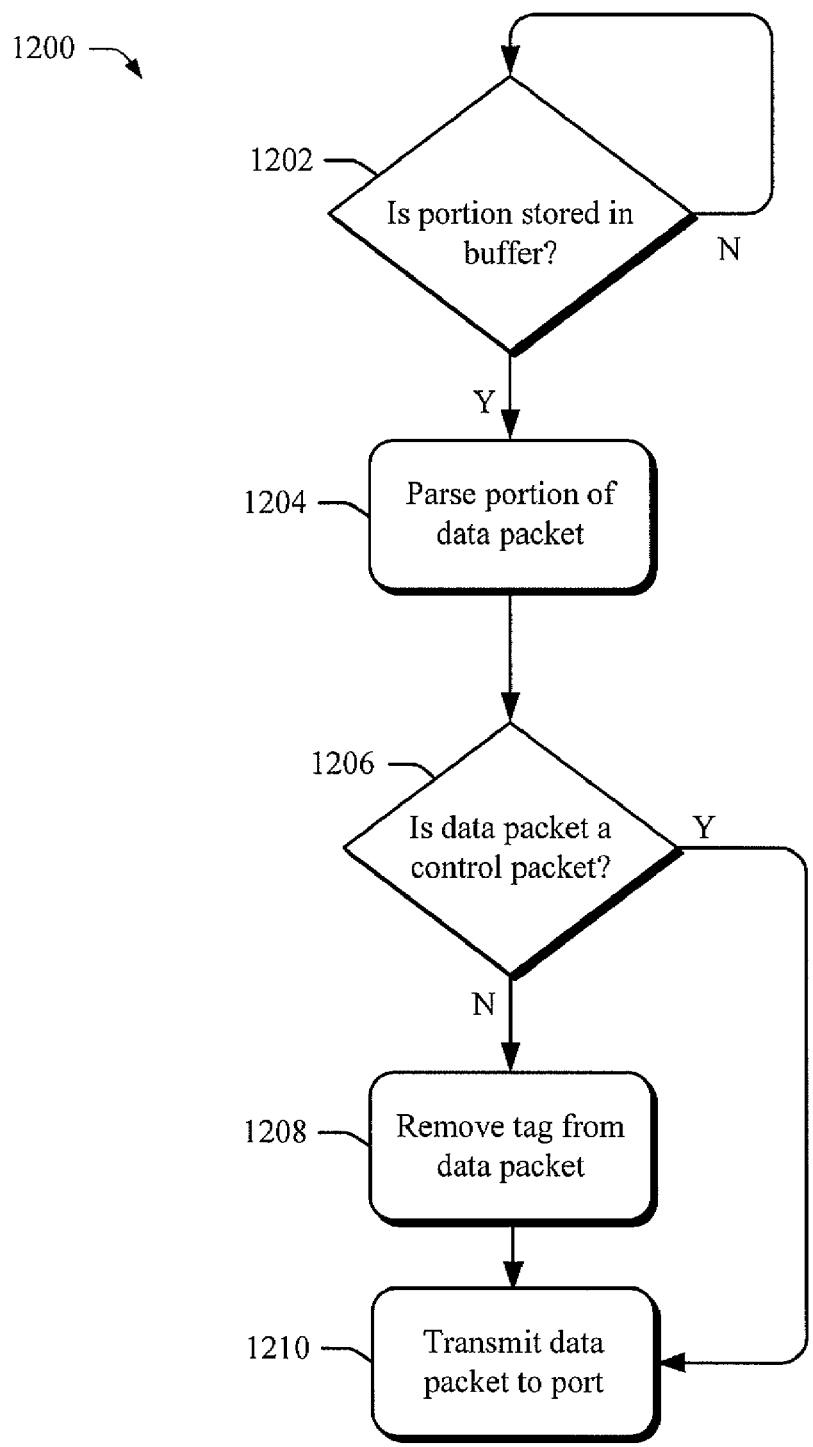
FIG. 12 is an exemplary process illustrating various embodiments and manners in which the tools relay a data stream from a data device to a network tunnel and that removes a tag.

FIG. 12 illustrates one embodiment of a method 1200 used by the strip module of FIG. 10 to remove a provisional tag from a data packet. First, the strip module determines 1202 if a portion of a data packet is stored in the buffer. Once a portion of the data packet is stored in the buffer, the strip module parses 1204 the portion. The portion includes bits indicating whether the data packet is a control packet. The portion may also include a customer tag.

As described above in relation to FIG. 11, the entire packet need not be stored in the buffer before the strip module parses the portion. In one embodiment, the buffer does not have capacity to store the entire data packet but does have capacity to store at least the portion.

In one embodiment, the buffer notifies the strip module when the portion of the data packet is available in the buffer. In another embodiment, the strip module monitors the buffer to determine when the portion is available. Of course, the strip module may use other methods well known to those of skill in the art to determine when the portion is available.

The strip module parses the portion to determine 1206 whether the data packet is a control packet such as an Ethernet BPDU, a spanning tree BPDU, an ARP, a flow control packet, or other control packet well known to those of skill in the art. If the data packet is a control packet, the strip module does not modify the packet and the buffer transmits 1210 the unmodified control packet to the port.

If the data packet is not a control packet, the strip module removes 1208 the provisional tag from the data packet. In one embodiment, the strip module modifies the buffer so that when the buffer transmits the data packet the data packet does not contain the provisional tag. Subsequently, the buffer transmits 1210 the data packet to the port.

Figure 13:
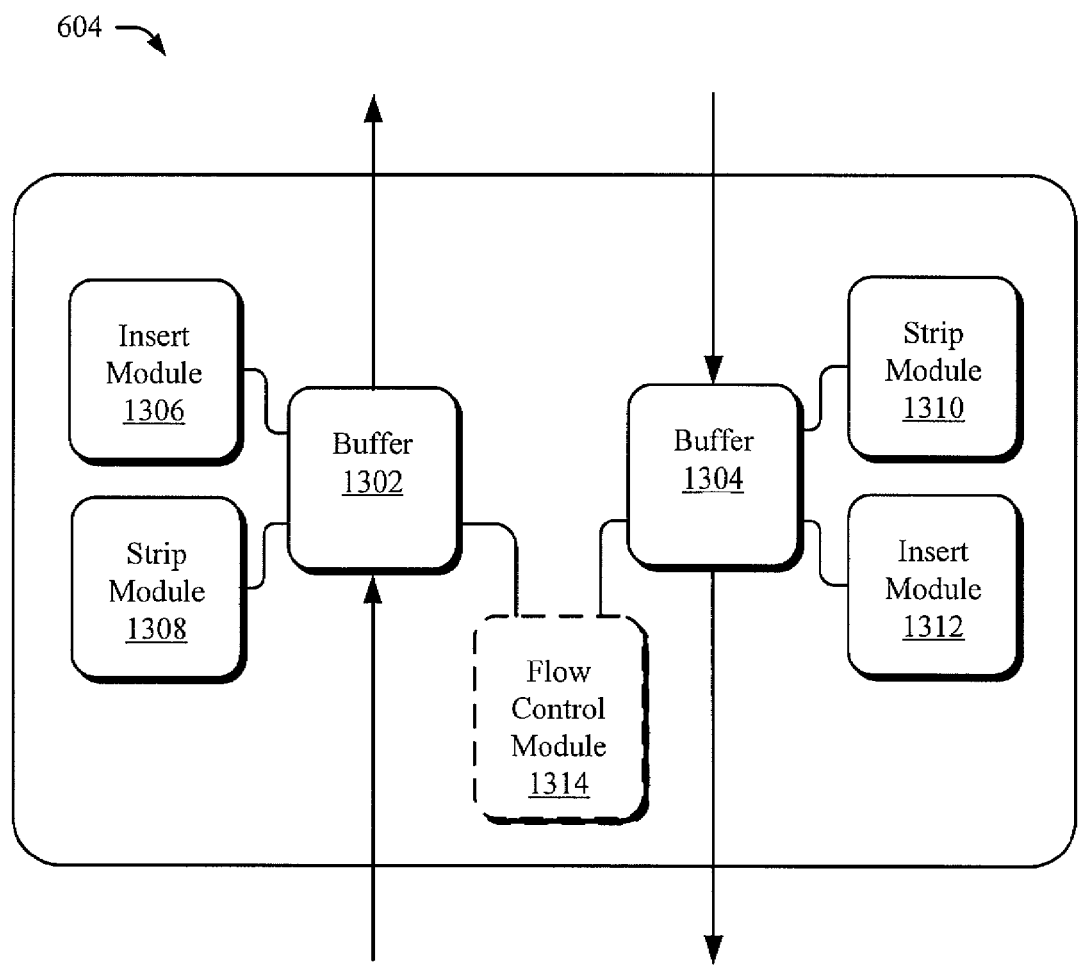
FIG. 13 illustrates an example of the network encapsulation module of FIG. 6.

FIG. 13 illustrates one embodiment of a network encapsulation module 604. The network encapsulation module performs inline encapsulation and de-encapsulation of data packets. The network encapsulation module comprises a first buffer 1302, a second buffer 1304, a first insert module 1306 and a first strip module 1308 both associated with the first buffer and a second strip module 1310 and a second insert module 1312 both associated with the second buffer 1304. The network encapsulation module may also comprise a flow control module 1314.

The first and second buffers are similar to the buffers described above in relation to FIG. 10. The capacities of the first and second buffer are chosen so that they are large enough to hold at least a portion of a data packet as described above. In one embodiment, each buffer stores no more than a portion of a data packet in order to minimize latency introduced by the network encapsulation module.

The capacities of the first and second buffers may be determined using methods well known to those of skill in the art by considering the size of the provisional tag, the size of the tunnel tag, the characteristics of the switch module, the maximum data packet size, the minimum data packet size, and other relevant factors.

The first insert module operates in a substantially similar manner to the insert module of the customer encapsulation module described above in relation to FIGS. 10 and 11 and is used to add a tunnel tag to a data packet received in the buffer from a switch module. (See FIG. 6 above illustrating the connection between the network encapsulation module and the switch module.) As described above in relation to FIG. 4, the tunnel tag may comprise one or more or a combination of one or more of the following a VLAN ID, MPLS label, a priority value, and other identifiers well known to those of skill in the art.

The value of the tunnel tag added to the data packet is determined by a mapping between provisional tag values and tunnel tag values. The network encapsulation module is configured with the mapping. In one embodiment, the mapping is static and is programmed into the hardware elements comprising the network encapsulation module. In another embodiment, the mapping may be changed by a service provider by downloading the mapping to the network encapsulation module as software, firmware, or as software used to configure an FPGA.

The first strip module operates in a substantially similar manner to the strip module of the customer encapsulation module described above in relation to FIGS. 10 and 12 and is used to remove a provisional tag from a data packet received in the buffer from the switch module.

The second strip module operates in a substantially similar manner to the first strip module and is used to remove a tunnel tag from a data packet received in the buffer from the port. The second insert module operates in a substantially similar manner to the first insert module and is used to add a provisional tag to a data packet received in the buffer from a port. (See FIG. 6 above illustrating connection between the network encapsulation module and the port.) The value of the provisional tag added to the data packet is determined using the mapping described above.

The flow control module 1314 prevents the first buffer 1302 from overflowing. As illustrated in FIG. 6, the network encapsulation module is connected inline between a port and the switch module. If the switch module sends data packets to the network encapsulation module at a rate that is greater than the network encapsulation module can transmit modified packets to the port, the first buffer 1302 (illustrated in FIG. 13) will eventually fill up and the service provider switch will drop subsequent portions of data packets.

To prevent this situation, the flow control module 1314 of FIG. 13 may send a message to the switch module, requesting that the switch module stop sending data packets to the network encapsulation module either for a period of time or indefinitely. The flow control module may also send a message to the switch module requesting that the switch module resume sending data packets to the network encapsulation module.

Figure 14:
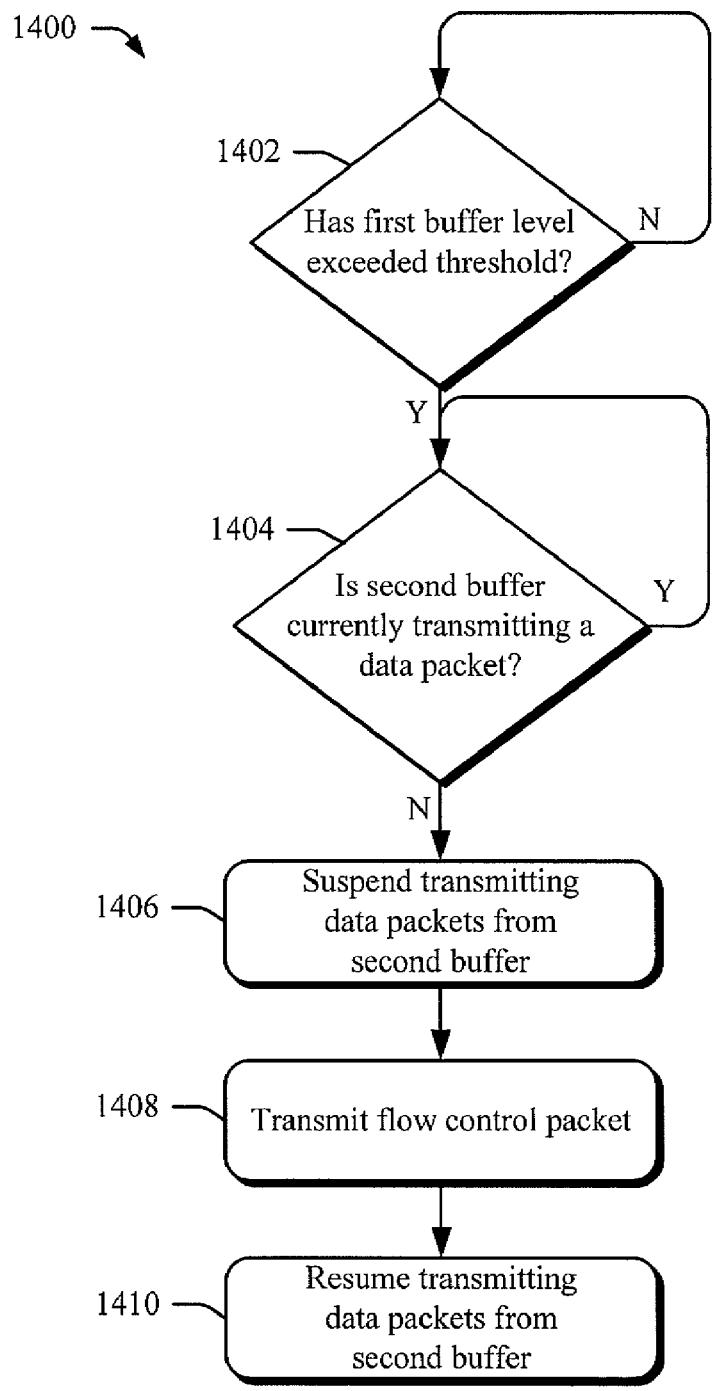
FIG. 14 is an exemplary process illustrating various embodiments and manners in which the tools relay a data stream from a data device to a network tunnel that involves a buffer level.

FIG. 14 illustrates one embodiment of a method 1400 used by the flow control module 1314 of FIG. 13 to prevent the first buffer 1302 of FIG. 13 from filling up. First, the flow control module determines 1402 whether the amount of data stored in the first buffer exceeds a predetermined threshold. The flow control module may monitor the buffer to make this determination. Alternatively, the buffer may notify the flow control module when the amount of data has exceeded the threshold.

If the threshold has been exceeded, the flow control module determines 1404 whether the second buffer 1304 of FIG. 13 is currently transmitting a data packet to the switch module 606 (See FIG. 6). If the second buffer is currently transmitting, the flow control module waits until the second buffer completes the transmission of the data packet.

Once the second buffer completes the transmission of the data packet, the flow control module suspends 1406 the second buffer so that the second buffer will not transmit a subsequent packet. Consequently, the second buffer 1304 may begin to fill up with data packets, or portions of a data packet received from the port 602.

Next, the flow control module transmits 1408 a flow control packet to the switch module. The flow control packet comprises a duration indicator. The duration indicator instructs the switch module either to suspend transmitting packets indefinitely or to suspend transmitting packets for a discrete amount of time. In one embodiment, the flow control packet comprises an Ethernet flow control packet described by the Institute of Electrical and Electronics Engineers (IEEE) 802.3x standard.

In one embodiment, the flow control module provides the flow control packet to the second buffer and the second buffer transmits the flow control packet to the switch module. In another embodiment, the flow control module transmits the flow control packet to the switch module.

Once the switch module receives the flow control packet, the switch module will suspend transmitting data packets to the network encapsulation module. Consequently, the first buffer 1302 will begin to empty since it will continue transmitting data to the port but will not be receiving additional data packets from the switch module.

Once the flow control packet has been transmitted to the switch module, the flow control module instructs the second buffer to resume 1410 transmission of data it has received from the port. The buffer transmits the data to the switch module.

The switch module may generate its own flow control packets independent of the network encapsulation module. These flow control packets are intended for devices such as the transport switch or customer switch that are connected to the service provider switch (See FIG. 2). These flow control packets are unaffected by the network encapsulation module and customer encapsulation module since, as discussed above in relation to FIGS. 11 and 12, these modules transmit control packets without modification to a port.

The service provider switch may provide the service provider with a count of the number of flow control packets sent and received by the switch module. However, this count may be increased due to the flow control packets sent by the network encapsulation module to the switch module even though the flow control packets sent by the network encapsulation module do not egress the service provider switch. The switch module may not be able to tell the difference between a flow control packet sent by the network encapsulation module and one sent by a transport switch or customer switch connected to the service provider switch.

To accurately report the number of flow control packets received by the service provider switch (as opposed to the number received by the switch module), the flow control module may also count the number of flow control packets it sends to the switch module. The service provider switch may then subtract this count from the total number of flow control packets received by the switch module to get an accurate count of the number of flow control packets received by the service provider switch. The service provider switch may similarly provide a count of the number of flow control packets received on a particular port.

The service provider switch may make the counts available to a user via a management interface such as a Command Line Interface (CLI), Simple Network Management Protocol (SNMP) interface, or other management interface well known to those of skill in the art.

Figure 15:
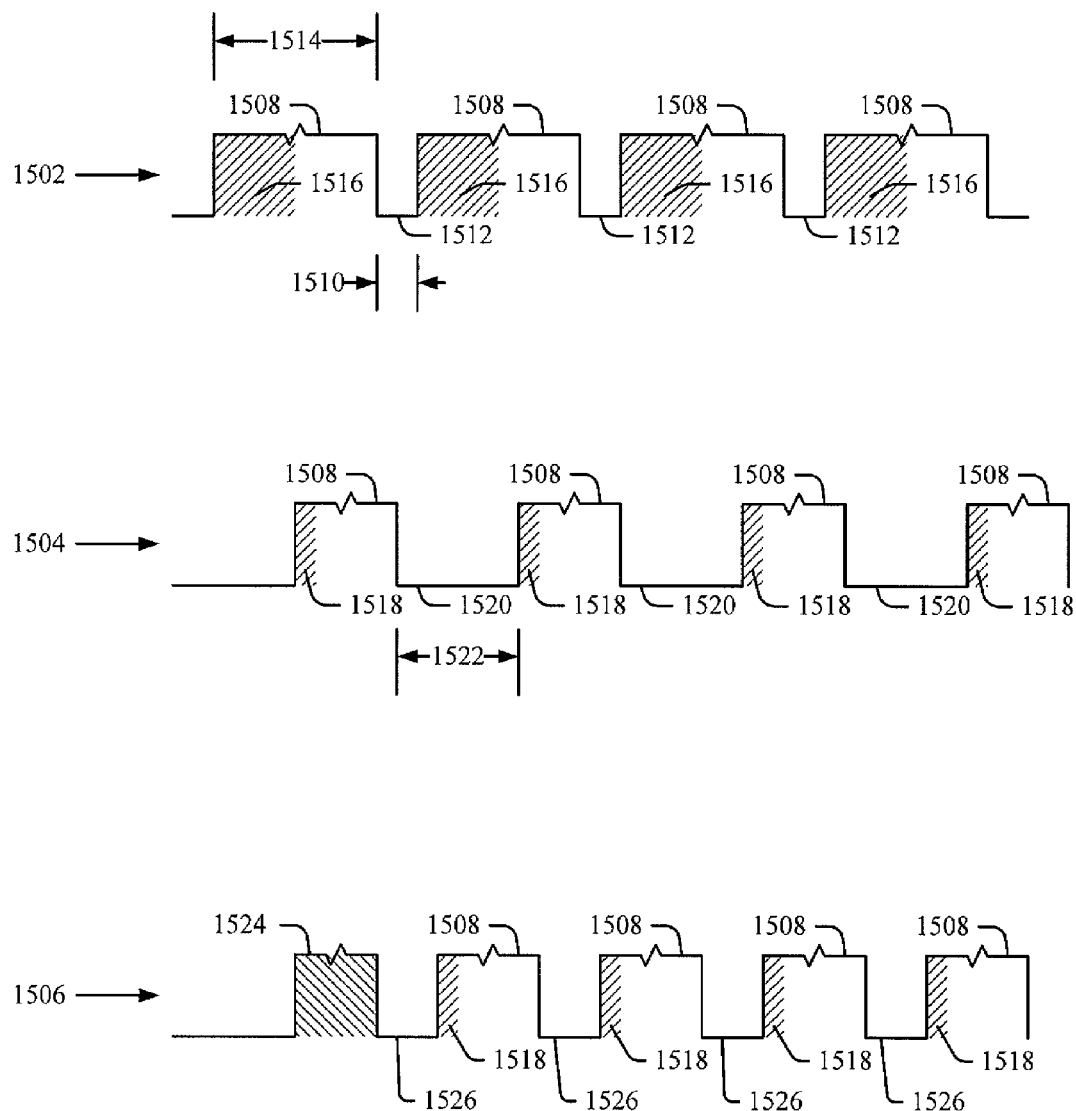
FIG. 15 illustrates another exemplary timing of data packet formats.

FIG. 15 depicts three packet-timing diagrams 1502, 1504, 1506. The first packet-timing diagram 1502 illustrates the transmission of four data packets 1508 on the link 610 between the port 602 and the network encapsulation module 604 of FIG. 6. The duration 1514 of each data packet is not shown to scale with respect to the duration 1510 of the gaps 1512 between the data packets 1508.

The duration 1514 of each data packet may vary, and each of the four data packets in the first packet-timing diagram 1502 may have a different duration. A standard for the particular technology that the data packets adhere to may specify a maximum packet duration and a minimum packet duration. The standard may additionally specify the minimum gap duration. The gaps depicted in the first packet-timing diagram have the minimum allowed duration, as discussed above in relation to FIG. 9.

Thus, the first packet-timing diagram illustrates data packets on link 610 arriving at the network encapsulation module at a maximum rate, sometimes called the line rate. Each of the four data packets of the first packet-timing diagram also includes a tunnel tag 1516. A data stream comprising the four data packets may be called a saturated data stream since each bit time of the link between the port and the network encapsulation module is consumed either by one of the four data packets or by one of the three minimum gaps 1512 that separate the four data packets.

The second packet-timing diagram 1504 illustrates the transmission of the four data packets illustrated in the first packet-timing diagram on link 612 after they have been modified by the network encapsulation module 604. The network encapsulation module has removed the tunnel tag 1516 from these packets and has added the provisional tag 1518. The network encapsulation module transmits the modified data packets to the switch module at a transmit rate.

In this embodiment, the transmit rate is the same as the receive rate at which the port sent the data packets to the network encapsulation module. As illustrated by the first packet-timing diagram, four data packets arrive during the illustrated time interval. The second packet-timing diagram illustrates a modified version of the same four data packets being transmitted by the network encapsulation module within a time period of the same duration. Thus, the network encapsulation module transmits the modified data packets at the same rate as it received the data packets since, in this example, it sends four data packets in the same amount of time that it took to receive the four data packets from the port.

Typically, a tunnel tag is significantly longer than a provisional tag. Consequently, the gap 1520 between the four data packets has increased so that it has a duration 1522 longer than a minimum gap duration. The increase in the gap duration is the difference between the length of the tunnel tag and the length of the provisional tag. Notice that the payload of the four data packets has not been altered. Instead, the header of the four data packets has been shortened because the provisional tag is shorter than the tunnel tag.

The third packet-timing diagram 1506 illustrates the transmission of the four data packets illustrated in the first packet-timing diagram in a scenario in which the flow control module 1314 has sent a flow control packet 1524 to the switch module.

As described above in relation to FIG. 14, the flow control module suspends the transmission of data packets from the second buffer. Next, the flow control module transmits a flow control packet 1524 having a known length. As illustrated in the third packet-timing diagram, this flow control packet 1524 is the first packet transmitted in the third packet-timing diagram.

While the flow control packet is being transmitted, the second buffer begins to fill up with the bits that comprise the first data packet illustrated in the first packet-timing diagram. Once the flow control packet has been transmitted, and the flow control module has instructed the second buffer to resume transmitting data packets, the second buffer may begin to drain. The second buffer will drain if the port goes idle and quits sending data packets to the network encapsulation module.

In addition, the second buffer will drain even if the port consistently sends data packets at line rate with minimum gaps between data packets if the tunnel tag is larger than the provisional tag. The second buffer drains because removing the tunnel tag and adding the provisional tag makes the data packets shorter overall.

The network encapsulation module takes advantage of the shorter data packets by transmitting data packets so that there is a minimum gap 1526 between data packets, rather than a gap comprising the minimum gap plus the difference in length between the tunnel tag and the provisional tag as illustrated in the second packet-timing diagram 1504.

Thus, the flow control module may insert flow control packets without dropping any of the data packets of a data stream entering the network encapsulation module at line rate. This is possible if during a discrete period of time the total length of all flow control packets inserted by the flow control module does not exceed the difference between the durations of the tunnel tag and the provisional tag times the number of data packets transmitted during the discrete period of time.

The network encapsulation module, as illustrated by the third packet-timing diagram, transmits the four data packets at the same rate that it received them from the port on link 610 since it transmits the four data packets within a time period equal to the time period required to receive the four data packets. In addition to transmitting the four data packets, the network encapsulation module also transmits the flow control packet during the time period. This is made possible by the reduced size of the four data packets.

Consequently, the network encapsulation module provides a way to control the flow of packets sent by the switch module to the network encapsulation module without affecting a line-rate data stream received by the network encapsulation module.

Other Embodiments of the Tools

The section above describes exemplary ways in which the tools relay a data stream from a data device to a network tunnel. The section below describes additional embodiments of the tools, some of which include aspects of the above-described exemplary ways.

Figure 16:
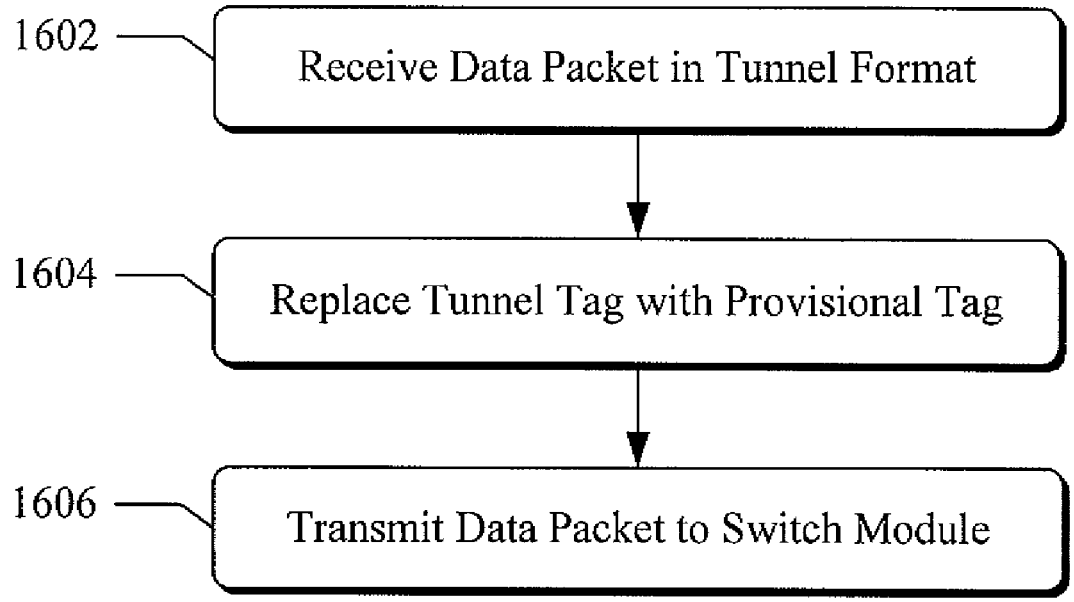
FIG. 16 is an exemplary process illustrating various embodiments and manners in which the tools relay a data stream from a network tunnel to a switch module.

FIG. 16 is an exemplary process 1600, which is illustrated as a series of blocks representing individual operations or acts performed by the tools. These and other processes herein may be performed by elements of exemplary embodiments 600 and/or a switch through computer-executable instructions on computer-readable media, hardware, a combination of both, or otherwise.

At block 1602, the tools receive a data packet in a tunnel format from a network tunnel. The data packet is received in an element inline between the network tunnel and a port of a switch module. The switch module may be the switch module described above in relation to FIG. 6. The data packet includes a tunnel tag. The element may be the network encapsulation module discussed above in relation to FIGS. 6 and 13.

In some embodiments, as in the embodiment described above in relation to FIGS. 6 and 7, the data packet further comprises a concealed user tag. The user tag may also be referred to as a customer tag or data stream tag. The user tag is concealed by the tunnel tag, as illustrated by example data packet 728 of FIG. 7, because the user tag is located in a payload portion of the data packet.

At block 1604, the element replaces the tunnel tag with a provisional tag. The element may determine the provisional tag value through a mapping between tunnel tag values and provisional tag values. The element is configured with the mapping. As described above in relation to FIG. 13, the element may be configured with the mapping via hardware, software, firmware, or software used to configure an FPGA.

In embodiments where the data packet includes a user tag, after the element has replaced the tunnel tag with the provisional tag the data packet includes both the provisional tag and the user tag as illustrated by example data packet 726 of FIG. 7. In these embodiments, the user tag is concealed by the provisional tag since the user tag is located in the payload portion of the data packet and the provisional tag is located in the tag position of the data packet.

As described above in relation to FIG. 13, the element may include a buffer, which stores no more than a fraction of the data packet while the element replaces the tunnel tag with the provisional tag. The element may, in one embodiment, receive a control packet from the network tunnel. In this situation, the element transmits the control packet to the port of the switch module without modifying the control packet as described above in relation to FIGS. 11 and 12.

At block 1606, the element transmits the data packet to the port of the switch module. As discussed above in relation to FIG. 6, the switch module is capable of selecting a switch module destination port for the data packet based, at least in part, on the provisional tag.

In one embodiment, subsequent data packets are received from the network tunnel at a particular rate. The element replaces the tunnel tags of each of the subsequent data packets with a corresponding provisional tag at the same rate at which the data packets are received and transmits the subsequent data packets to the port of the switch module at the same rate.

Figure 17:
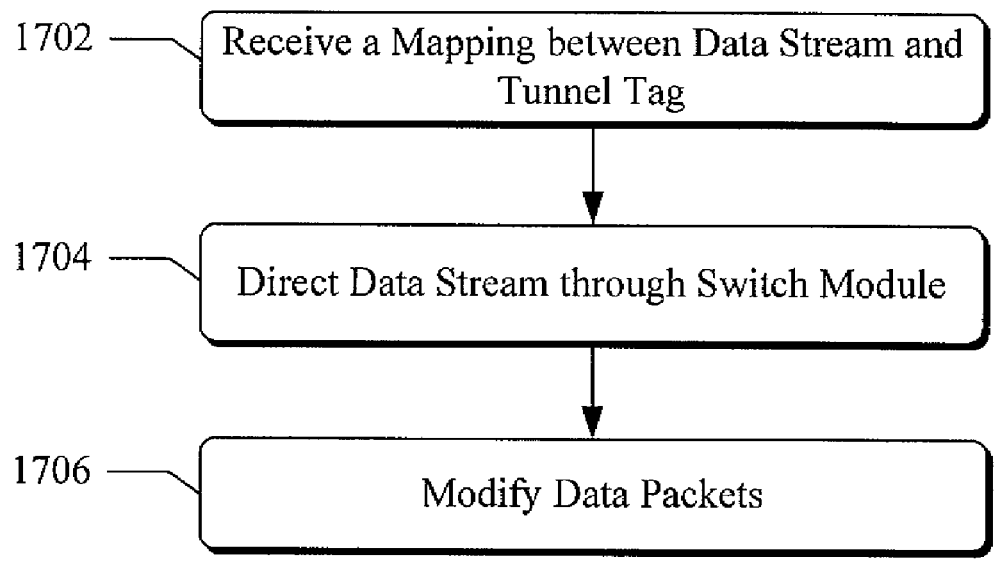
FIG. 17 is an exemplary process illustrating various embodiments and manners in which the tools relay a data stream.

FIG. 17 illustrates another embodiment of the tools as a process 1700, which is illustrated as a series of blocks representing individual operations or acts performed by the tools.

At block 1702, the tools receive a mapping between a data stream originating on the first network and a tunnel tag used to distinguish the data stream from other data streams in a second network. The tools may receive the mapping as part of a hardware configuration or through software, firmware, or other methods of conveying a mapping well known to those of skill in the art.

This mapping may specify a correlation between data packet identifiers and a tunnel tag value. The data packet identifiers may be portions of the data packet. For example, a VLAN ID, MPLS label, a priority value, a destination address, and a source address may each be used as a data packet identifier.

The mapping is a correlation between one or more of these data packet identifiers and a particular tunnel tag value. For example, the mapping may specify that a data stream made up of data packets with a particular VLAN ID and a particular destination address are mapped to a particular tunnel tag value.

At block 1704, the tools direct the data stream from the first network through a switch module to an entity capable of adding the tunnel tag to the data packets of the data stream. In some embodiments, as discussed above in relation to FIG. 6, the switch module is incapable of adding the tunnel tag to data packets. The entity may be the network encapsulation module 604 described above in relation to FIGS. 6 and 13. The switch module and the entity may reside within a single chassis.

At block 1706, the entity modifies the data packets of the data stream by adding the appropriate tunnel tag as determined by the mapping to each of the data packets. In one embodiment, such as the embodiment described above in relation to FIGS. 1 and 6, the entity forwards the modified data stream to the second network. The entity may have a single output port through which the entity forwards the modified data stream to the second network as described above in relation to FIG. 6.

In one embodiment, such as the embodiment described above in relation to FIGS. 1 and 6, the process 1700 may also include processing a data stream traveling in the opposite direction. In this embodiment, the tools receive a second data stream from the second network and modify the data packets of the second data stream by removing the tunnel tag from each of the data packets. The tools then forward the modified second data stream to the switch module. The modified second data stream is then forwarded through the switch module to the first network. The switch module itself may not be capable of removing the tunnel tag.

Figure 18:
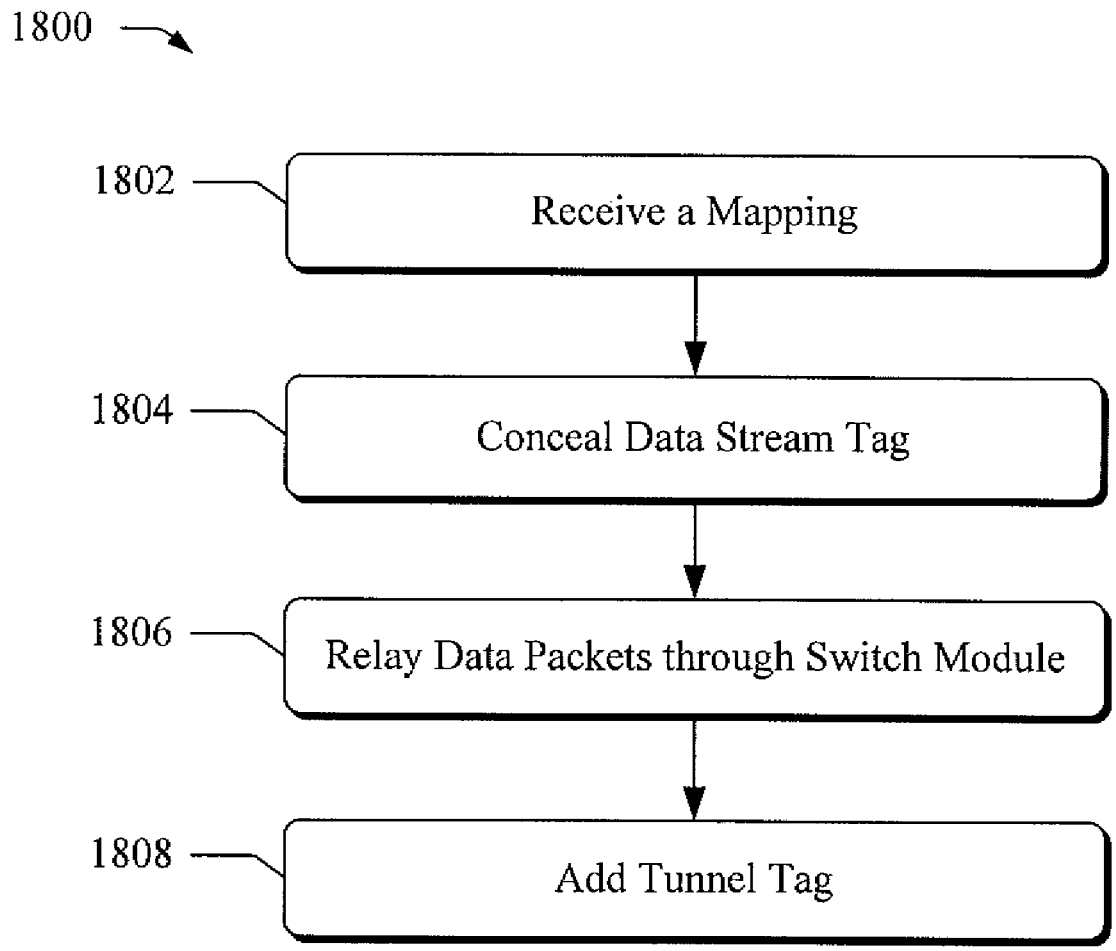
FIG. 18 is an exemplary process illustrating various embodiments and manners in which the tools relay a data stream through a switch module based on a received mapping.

FIG. 18 illustrates another embodiment of the tools as a process 1800, which is illustrated as a series of blocks representing individual operations or acts performed by the tools.

At block 1802, the tools receive a mapping between a data stream tag, a port, a provisional tag, and a tunnel tag associated with the network tunnel. The data stream tag may also be referred to as a user tag. The mapping maps the combination of the data stream tag and port to a provisional tag value and a tunnel tag value. In one embodiment, multiple provisional tag values map to a single tunnel tag value.

A first data stream received from a data device and comprising data packets is relayed to a network tunnel based on the mapping. The network tunnel is not capable of accepting the first data stream unless the data packets of the first data stream include the tunnel tag specified by the mapping.

The data stream tag, in one embodiment, is a particular set of data packet identifiers located in the tag position of the data packet. For example, the data stream tag may comprise a VLAN ID and priority value located in the tag position of an Ethernet data packet. The port is a switch module port connected to the data device and is one of the inputs of the mapping because a switch module through which the first data stream is relayed is not capable of distinguishing the first data stream from a second data stream having the same data stream tag but received on a different port.

At block 1804, the tools conceal the data stream tag from a switch module, such as by adding the provisional tag named by the mapping to the data packets.

At block 1806, the tools relay the data packets through the switch module based on the provisional tag. The tools may relay the first data stream to the network tunnel after the tunnel tag has been added to the data packets and after the data packets have been relayed by the switch module. In another embodiment, the tunnel tag may be added to the data packets before the data packets are relayed by the switch module. As described above in relation to FIG. 13, the tools may strip the provisional tag from the data packets before relaying the data packets to the network tunnel.

At block 1808, the tools add the tunnel tag named by the mapping to the data packets. In one embodiment, the tools may add the tunnel tag to the data packets prior to relaying the data packets through the switch module. In this embodiment, the tools may conceal both the tunnel tag and the data stream tag from the switch module with the provisional tag. In some embodiments, the provisional tag is not stripped from the data packets before relaying the data packets to the network tunnel. In these embodiments, the tunnel tag conceals the provisional tag.

Figure 19:
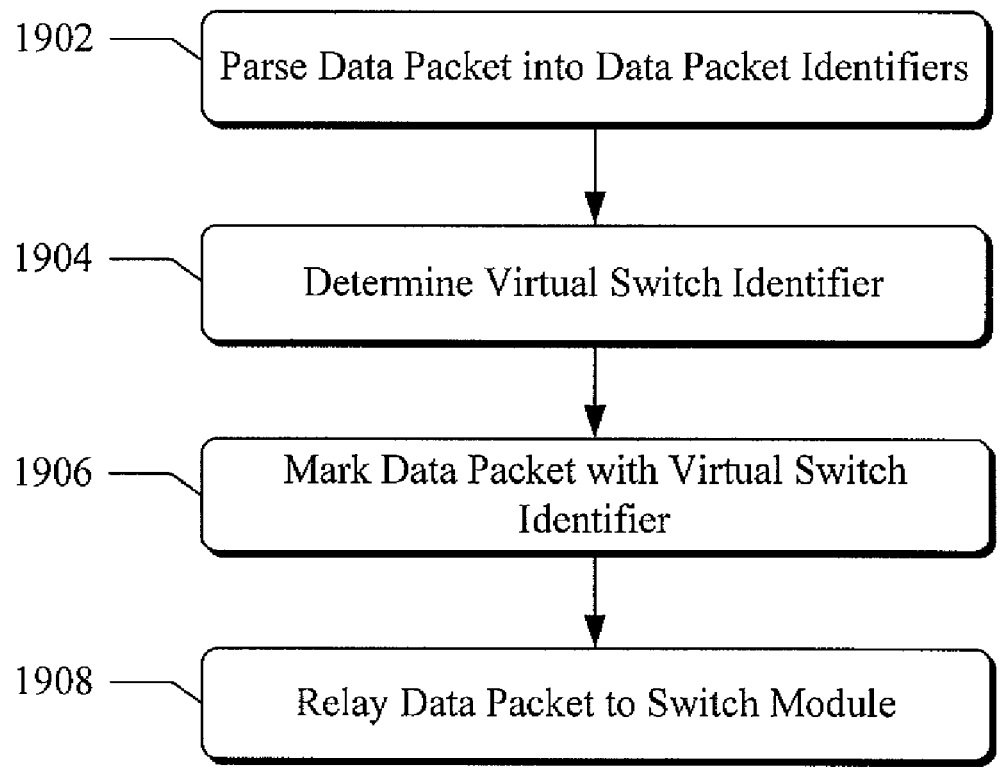
FIG. 19 is an exemplary process illustrating various embodiments and manners in which the tools enable virtual switching using a virtual switch instance identifier.

FIG. 19 illustrates a process 1900 for simplifying a forwarding decision, which is illustrated as a series of blocks representing individual operations or acts performed by the tools.

At block 1902, the tools parse a data packet into one or more data packet identifiers, each identifier being capable of influencing the forwarding decision. The identifiers may comprise a user tag. For example, if the identifiers are a VLAN ID and a priority value of an Ethernet packet, the identifiers are both part of a user tag. However, other portions of the data packet may also be identifiers. For example, the source address and destination address could also be identifiers even though they are not part of the user tag.

At block 1904, the tools determine a virtual switch tag based on a mapping. The mapping correlates values of the identifiers with a particular virtual switch tag. The virtual switch tag may be the provisional tag described above in relation to FIG. 11. The virtual switch tag may also be another means of identifying a data packet well known to those of skill in the art such as a particular bit pattern located in a particular position of a data packet.

The tools may partially make a forwarding decision for a data packet by assigning a virtual switch tag. This virtual switch tag may restrict the number of possible switch module ports to which the switch module may forward the data packet to switch module ports that are associated with the virtual switch tag.

At block 1906, the tools mark the data packet with the virtual switch tag. The tools may mark the data packet by adding a tag to the data packet containing the virtual switch tag. Alternatively, the tools may replace an existing user tag with the virtual switch tag. If an existing tag is left in place, and a new tag containing the virtual switch tag is added, the new tag conceals the existing tag.

The switch module is incapable of making a forwarding decision based on particular data packet identifiers, namely the identifiers that comprise the user tag, because marking the data packet results in concealing the particular identifiers from the switch module. The particular identifiers are concealed because they are moved from a tag position in the data packet into a payload position of the data packet as described above in relation to FIG. 4.

In one embodiment, the tools store no more than a fraction of the data packet while determining the virtual switch tag and marking the data packet to reduce latency.

At block 1908, the tools relay the data packet to a switch module configured to make a forwarding decision for the data packet based on the virtual switch tag. The switch module is also configured to limit the switch ports to which the data packet may be forwarded to switch ports associated with the virtual switch tag.

At least one of the ports associated with the virtual switch instance may be a logical port. A logical port relays a set of data packets having a particular set of identifiers that ingresses or egresses a particular physical port. For example, all data packets on a physical port with a first VLAN ID may belong to a first logical port and all data packets on the same physical port with a second VLAN ID may belong to a second logical port.

The tools may also strip the virtual switch tag from the data packet after the switch module relays the data packet to a switch port as described above in relation to FIG. 10.

Figure 20:
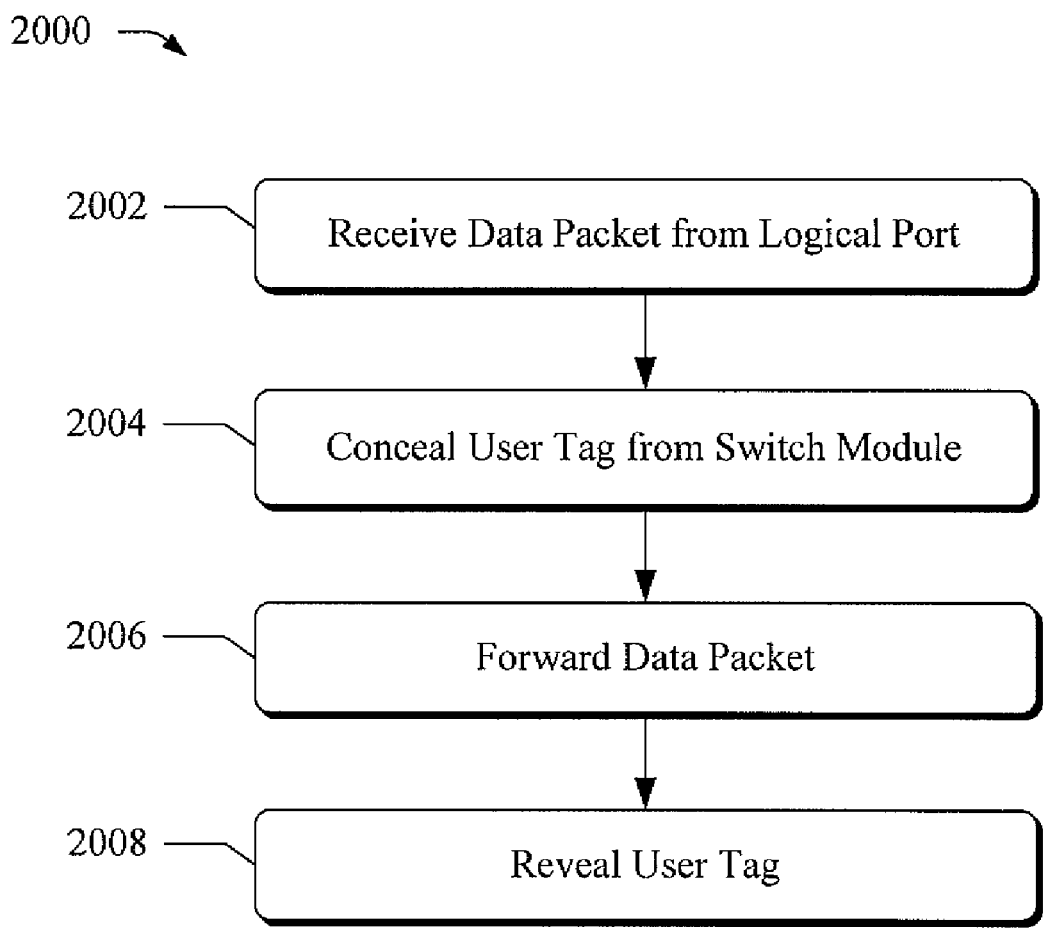
FIG. 20 is an exemplary process illustrating various embodiments and manners in which the tools conceal and reveal user tags.

FIG. 20 illustrates a process 2000 for restricting a data packet to a virtual switch instance, which is illustrated as a series of blocks representing individual operations or acts performed by the tools.

At block 2002, the tools receive a data packet from one of a plurality of logical ports associated with the virtual switch instance. Each data packet may include a user tag. Each logical port may comprise data packets including one or more particular non-virtual identifier values as discussed above in relation to block 1908. A single physical port may relay data packets belonging to a plurality of different logical ports.

At block 2004, the tools conceal the user tag from a switch module by adding a provisional identifier to the data packet. The provisional identifier may be uniquely associated with the virtual switch instance.

At block 2006, the tools forward the data packet through the switch module to one of the other logical ports associated with the virtual switch instance. The switch module makes its forwarding decision for the data packet based at least in part on the provisional identifier. The switch module is not capable of forwarding the data packet based on the concealed user tag because the concealed user tag is not in the tag position of the data packet.

At block 2008, the tools reveal the user tag by removing the provisional identifier and moving the user tag back into the tag position of the data packet.

The tools may also prevent the data packet from being forwarded to a logical port that is not associated with the virtual switch instance as described above in relation to FIG. 4. The tools may also preclude a second data packet from being forwarded to one of the logical ports associated with the virtual switch instance if the second data packet is not marked with the same provisional tag as the data packet, also described above in relation to FIG. 4.

Figure 21:
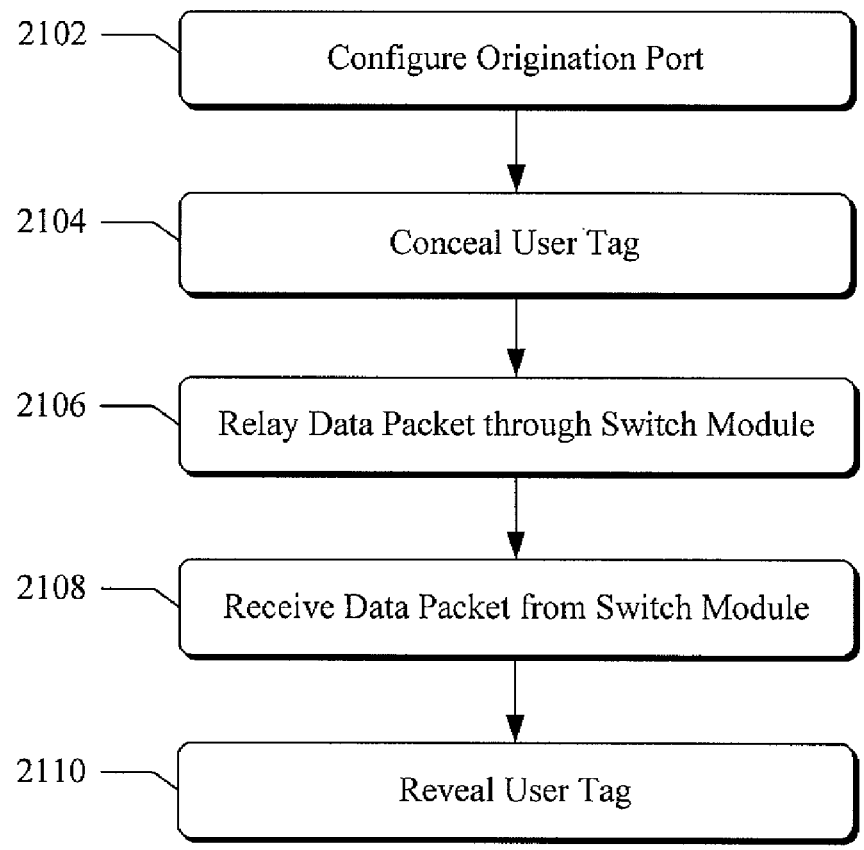
FIG. 21 is an exemplary process illustrating various embodiments and manners in which the tools enable virtual switching.

FIG. 21 illustrates a process 2100 for transparently relaying a data packet to a destination port, which is illustrated as a series of blocks representing individual operations or acts performed by the tools.

At block 2102, the tools configure an origination port to accept a data packet comprising a user tag regardless of the value of the user tag.

At block 2104, the tools conceal the user tag by adding a provisional tag to the data packet. The tools may add the provisional tag in the tag position of the data packet and move the user tag to a payload position of the data packet as described above in relation to FIG. 7. The provisional tag is associated with the user tag through a mapping.

At block 2106, the tools relay the data packet, through a switch module, to a switch module destination port based on the provisional tag. The switch module is incapable of relaying based on the user tag since the user tag is not in the tag position of the data packet.

At block 2108, the tools receive the data packet from the switch module destination port. At block 2110, the tools reveal the user tag. The tools may reveal the user tag by removing the provisional tag and restoring the user tag to the tag position.

The tools may receive subsequent data packets at a particular rate. In response, the tools may conceal the user tags of each of the subsequent data packets with a provisional tag at the same particular rate and relay the subsequent data packets through the switch module at the particular rate as described above in relation to FIG. 10. Furthermore, the tools may reveal the user tags of the subsequent data packets at the same particular rate.

Figure 22:
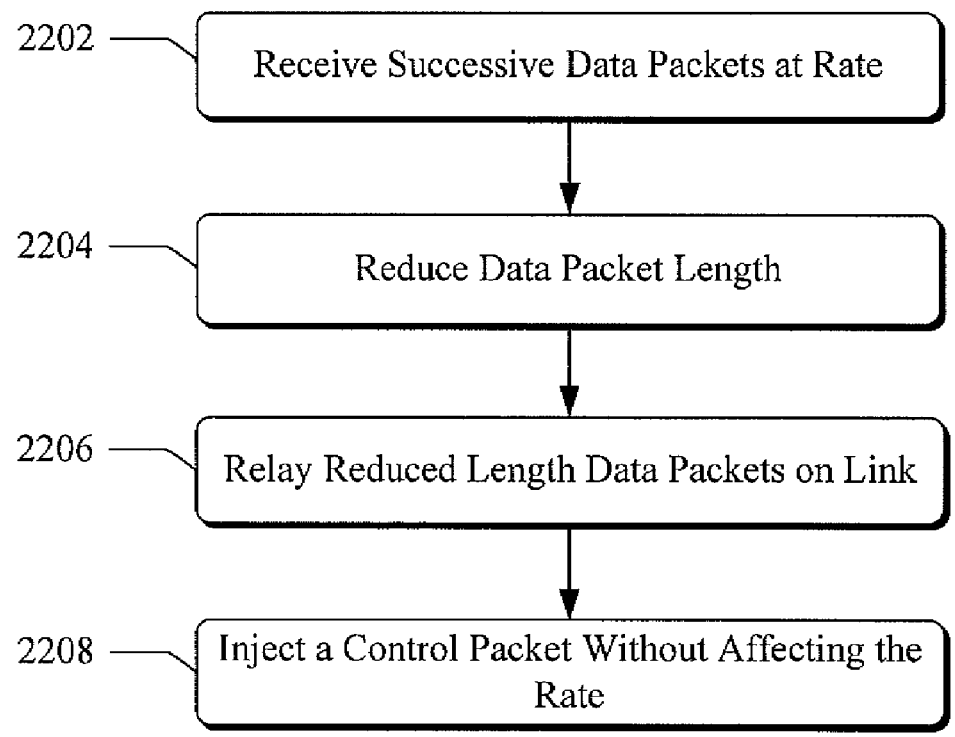
FIG. 22 is an exemplary process illustrating various embodiments and manners in which the tools inject a control message by reducing a data packet length.

FIG. 22 illustrates another embodiment of the tools as a process 2200, which is illustrated as a series of blocks representing individual operations or acts performed by the tools.

At block 2202, the tools receive successive data packets from a data source at a first rate. For example, the tools may receive successive data packets from a port 602 as described above in relation to FIGS. 6 and 13. The data packets, as received, are separated in time by at least a minimum gap as discussed above in relation to FIG. 15.

At block 2204, the tools reduce the length of each data packet received from the data source. The tools may do so without altering a payload associated with each data packet. In one embodiment, the tools reduce the length by reducing the length of a header of each data packet. The tools may reduce the length by removing a tunnel tag and adding a provisional tag as discussed above in relation to FIG. 13.

At block 2206, the tools relay the reduced length data packets on a link to a data device at a second rate. The data device may be a switch module 606, as discussed above in relation to FIGS. 6 and 13. The second rate is the same as the first rate in that the same number of data packets are transmitted to the data device in an amount of time as were received in the same amount of time as illustrated in the timing diagrams of FIG. 15.

At block 2208, the tools inject a control packet on the link without affecting the second rate. The control packet may be one of the control packets discussed above in relation to FIG. 12 such as a flow control packet or Ethernet BPDU. This may be done by suspending the transmission of data packets from a buffer, sending the control packet, resuming the transmission of data packets from the buffer, and imposing a minimum gap between successive data packets until the buffer empties as discussed above in relation to FIG. 14. The minimum gap may be defined by a standard, such as the Ethernet standard.

The control packet may instruct the data device to modify a data stream that the data device is sending to the data source. For example, the control packet may be a flow control packet that instructs a switch module to suspend transmitting data packets to a network encapsulation module as discussed above in relation to FIG. 14. The control packet may instruct the switch module to suspend transmitting the data stream for a discrete period of time or to suspend transmitting the data stream indefinitely.

Figure 23:
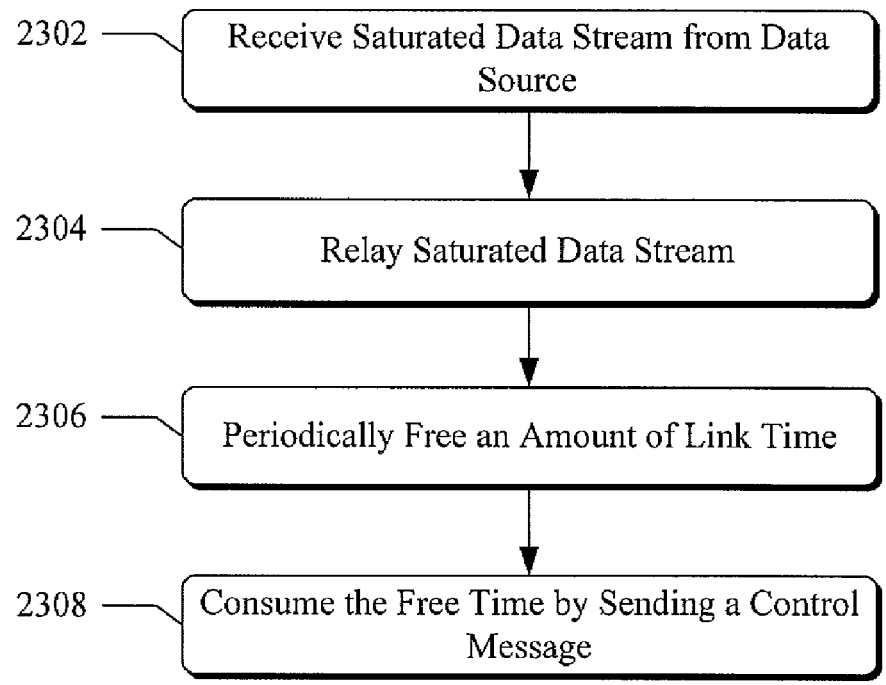
FIG. 23 is an exemplary process illustrating various embodiments and manners in which the tools periodically free an amount of link time.

FIG. 23 illustrates another embodiment of the tools as a process 2300, which is illustrated as a series of blocks representing individual operations or acts performed by the tools.

At block 2302, the tools receive data packets from a data source on a first link such as the link 610 of FIG. 6. The data packets may comprise a saturated data stream, as described above in relation to FIG. 15, since each bit time of the saturated data stream is consumed by either a portion of a data packet or portion of a required minimum gap. The data packets may be Ethernet packets or otherwise.

At block 2304, the tools relay the saturated data stream to a data device on a second link, such as the link 612 of FIG. 6. The data device and data source may each be data packet switches. The data device may also be the switch module 606 described above in relation to FIG. 6.

At block 2306, the tools periodically free an amount of link time on the second link by reducing the length of a header of each data packet comprising the saturated data stream. Reducing the header may involve removing a tunnel tag from each data packet and adding a provisional tag to each data packet before relaying the data packets to the data device as discussed above in relation to FIGS. 13 and 14. The provisional tag may be shorter than the tunnel tag and, as discussed above, may comprise at least one MPLS label.

At block 2308, the tools consume at least a portion of the periodic amount of link time by sending a control message to the data device on the second link. The control message may be one of the control packets discussed above in relation to FIG. 12. The control message may also be a message conveyed using a plurality of data packets rather than just a single control packet. The control message may also be an Ethernet Flow Control packet as discussed above in relation to FIGS. 13-15.

Figure 24:
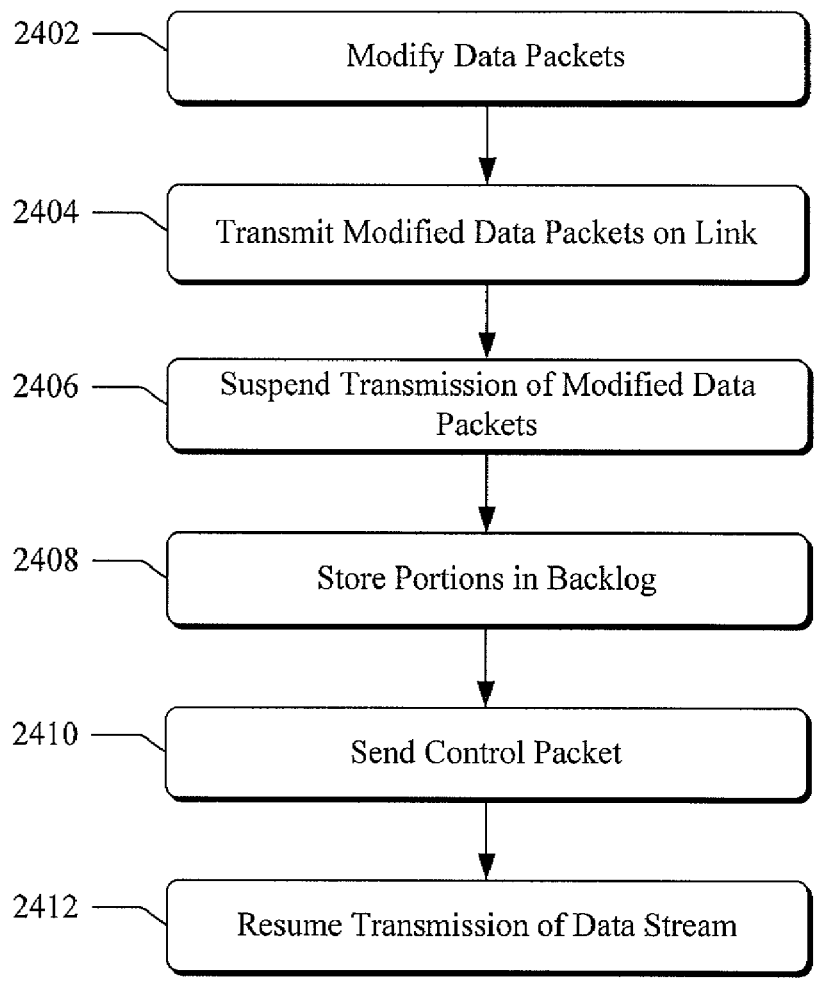
FIG. 24 is an exemplary process illustrating various embodiments and manners in which the tools suspend and resume transmission of a data stream effective to enable injection of a control message.

FIG. 24 illustrates another embodiment of the tools as a process 2400, which is illustrated as a series of blocks representing individual operations or acts performed by the tools.

At block 2402, the tools modify data packets comprising a received data stream to reduce their length. The data packets are reduced in length without impacting a payload associated with each data packet. This may be done by reducing the length of a header associated with each data packet.

The data packets of the received data stream may be separated by no more than a minimum gap in some embodiments, such as the embodiment described above in relation to FIG. 15.

The data packets may be modified by removing a first tag from each of the data packets and adding a second tag to each of the data packets as discussed above in relation to FIG. 13. In this embodiment, the first tag is longer than the second tag.

At block 2404, the tools transmit the modified data packets on a link. At block 2406, the tools suspend the transmission of the modified data packets to free the link for sending a control packet on the link. The tools may wait to suspend the transmission of the modified data packets until a data packet currently being transmitted by a buffer has been completely transmitted as described above in relation to FIG. 14.

At block 2408, the tools store portions of the data stream received while transmission is suspended in a backlog. The backlog may be a buffer like the buffer 1304 discussed above in relation to FIG. 13. The backlog may also be a First In First Out (FIFO) Buffer that has capacity to store no more than a portion of a data packet to minimize latency.

At block 2410, the tools send the control packet on the link while transmission of the modified data packets is suspended. The control packet may be an Ethernet flow control packet sent in response to a buffer threshold being exceeded, such as the buffer 1302 of FIG. 13.

At block 2412, the tools resume transmission of the data stream once the control packet has been sent. The tools transmit successive modified data packets separated by a minimum gap until the backlog has been emptied.

CONCLUSION

The above-described tools enable equipment to relay a data stream from a data device to a network tunnel. By so doing, the tools permit greater use of network tunnels to connect user networks due to the simple, low-cost method of modifying data packets from a tunnel format to a user format, or from a user format to a tunnel format provided by the tools. The above-described tools also enable virtual switching using a provisional identifier to conceal a user identifier. By so doing, the tools permit a low-cost, efficient method of virtual switching. The above-described tools also enable injecting in-band control messages without impacting a data rate. By so doing, the tools permit more efficient use of an existing link. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A method of restricting a data packet to a virtual switch instance comprising:
   a packet switch receiving a data packet from a first one of a plurality of logical ports of the packet switch associated with a virtual switch instance, the data packet comprising a user tag;
   the packet switch concealing the user tag from a switch module comprised by the packet switch with a provisional identifier, wherein the provisional identifier is uniquely associated with the virtual switch instance;
   the packet switch forwarding, through the switch module, the data packet to a second one of the other logical ports of the plurality associated with the virtual switch instance based at least in part on the provisional identifier, the switch module being incapable of forwarding the data packet based on the concealed user tag; and
   the packet switch revealing the user tag by stripping the provisional identifier; and
   subsequent to the packet switch revealing the user tag, the packet switch transmitting the data packet to a network node connected to the packet switch, the network node being physically distinct and remotely located from the packet switch, wherein the transmitted data packet does not include the provisional identifier.

2. The method of claim 1, wherein each logical port relays data packets having particular values for the provisional identifiers.

3. The method of claim 1, wherein the provisional identifier comprises a Virtual Local Area Network identifier.

4. The method of claim 1, wherein the user tag comprises a Virtual Local Area Network identifier.

5. The method of claim 1, wherein each logical port is associated with a physical port, and each physical port comprises a plurality of logical ports.

6. The method of claim 1, wherein concealing further comprises adding the provisional identifier in a tag position within the data packet and revealing further comprises removing the provisional identifier from the tag position.

7. The method of claim 1, further comprising:
   preventing the data packet from being forwarded to a logical port not associated with the virtual switch instance; and
   precluding a second data packet that is not marked with the same provisional identifier as the first-mentioned data packet from being forwarded to one of the logical ports associated with the virtual switch instance.

8. A packet switch comprising:
   a switch module configured to implement a virtual switch instance;

a plurality of logical ports associated with the virtual switch instance;
an encapsulation module that:
receives a data packet from a first one of the logical ports of the plurality, the data packet comprising a user tag; and
conceals the user tag from the switch module with a provisional identifier that is uniquely associated with the virtual switch instance and then forwards the data packet comprising the concealed user tag to the switch module;
a de-encapsulation module that:
receives the data packet from the switch module; and
reveals the user tag of the data packet by stripping the provisional identifier and then forwards the data packet to a second one of the logical ports of the plurality; and
wherein the switch module receives the data packet from the encapsulation module and forwards the data packet to the de-encapsulation module based at least in part on the provisional identifier.

9. The packet switch of claim 8, wherein the provisional identifier comprises a Virtual Local Area Network identifier.

10. The packet switch of claim 8, wherein the user tag comprises a Virtual Local Area Network identifier.

11. The packet switch of claim 8, wherein the encapsulation module is configured to conceal the user tag by adding the provisional identifier to the data packet.

* * * * *